United States Patent [19]
Takahashi

[11] Patent Number: 6,124,977
[45] Date of Patent: Sep. 26, 2000

[54] IMAGE DISPLAY APPARATUS

[75] Inventor: Koichi Takahashi, Hachioji, Japan

[73] Assignee: Olympus Optical Co., Ltd., Tokyo, Japan

[21] Appl. No.: 09/188,566

[22] Filed: Nov. 10, 1998

[30] Foreign Application Priority Data

Nov. 12, 1997 [JP] Japan .................................. 9-310492

[51] Int. Cl.[7] .......................... G02B 27/14; G02B 27/12; G02B 9/00
[52] U.S. Cl. .......................... 359/636; 359/640; 359/738
[58] Field of Search .................. 359/627, 629, 359/630, 631, 633, 638, 636, 640, 738

[56] References Cited

U.S. PATENT DOCUMENTS

| | | | |
|---|---|---|---|
| 5,317,405 | 5/1994 | Kuriki et al. | 348/20 |
| 5,543,866 | 8/1996 | Van De Velde | 351/221 |
| 5,701,202 | 12/1997 | Takahashi | 359/631 |
| 5,706,136 | 1/1998 | Okuyama et al. | 359/630 |
| 5,726,782 | 3/1998 | Kato et al. | 359/3 |
| 5,750,977 | 5/1998 | Suzuki | 235/472 |
| 5,835,276 | 11/1998 | Asai et al. | 359/638 |
| 5,917,656 | 6/1999 | Hayakawa et al. | 359/637 |
| 5,936,773 | 8/1999 | Togino | 359/630 |

*Primary Examiner*—Georgia Epps
*Assistant Examiner*—David N. Spector
*Attorney, Agent, or Firm*—Pillsbury Madison & Sutro LLP

[57] ABSTRACT

An image display apparatus using a modified prism as an ocular optical system, in which unwanted light caused by reflection or transmission at an area outside the effective area of a reflecting or transmitting surface is reduced to provide a favorable image of high resolution, which is free from flare or ghost. The prism member (10), which is used as an ocular optical system, includes a first surface (1) having an action through which a light beam enters the prism member, a second surface (2) having an action by which the light beam is reflected in the prism member, and a third surface (3) having an action through which the light beam exits from the prism member. A black coating (12), which is an antireflection member having a flare- or ghost-preventing action, is provided over a part of a non-effective reflecting area of at least the second surface (2), exclusive of an effective reflecting area (an area reflecting an effective light beam that forms the virtual image).

21 Claims, 14 Drawing Sheets

IMAGE DISPLAY APPARATUS

BACKGROUND OF THE INVENTION

The present invention relates to an image display apparatus and, more particularly, to a head- or face-mounted image display apparatus that can be retained on the observer's head or face.

As a conventional image display apparatus, Japanese Patent Application Unexamined Publication (KOKAI) No. 8-313829, filed by the present applicant, is known. This image display apparatus projects an image displayed by an image display device into an observer's eyeball through a modified prism formed from three surfaces as an ocular optical system. In the modified prism, the three surfaces are each decentered with respect to the observer's visual axis, and a space formed by the three surfaces is filled with an optically transparent medium having a refractive index of about 1.5. Let us assume the three surfaces of the modified prism as follows: A surface through which light emitted from the image display device enters the modified prism is a first surface; a reflecting surface opposite to the observer's eyeball is a second surface; and a surface close to the observer's eyeball is a third surface. Light rays emitted from the image display device enter the modified prism while being refracted through the first surface. The rays are internally reflected by the third surface toward the second surface. The reflected rays are internally reflected by the second surface toward the third surface. Then, the reflected rays exit from the modified prism while being refracted through the third surface and reach the observer's eyeball.

In a modified prism formed from decentered surfaces as stated above, when reflection takes place in the prism at an angle not exceeding the critical angle, the reflecting surface needs to be provided with a coating of a metal having a high reflectivity, e.g. aluminum. Moreover, there is a portion containing an area outside the effective area. At such a portion, not only transmission but also internal reflection or other similar phenomenon occurs. Accordingly, light rays emitted from the image display device or light rays externally entering the modified prism include not only light traveling along the above-described normal path of display light but also light traveling along some other ray path to reach the observer's eyeball. There is also light that reaches the observer's eyeball by transmission or reflection at an area outside the effective area. These light rays are unnecessary for the observer and recognized as ghost or flare, causing resolution and MTF (Modulation Transfer Function) to be degraded. Thus, the unwanted light has an adverse effect on the image for observation.

Under these circumstances, the present applicant proposed, in Japanese Patent Application Unexamined Publication (KOKAI) No. 9-65245, to provide a light-blocking device between an ocular optical system and an observer's eyeball in an image display apparatus of the type described above to prevent light from an image display device from traveling along an optical path other than the normal path of display light and entering the pupil of the observer's eye as ghost light, which would otherwise cause a ghost image or the like to be formed outside the display area, and also prevent external light from the outside world from being reflected by a surface of the modified prism and entering the observer's pupil as flare or ghost, which would otherwise cause the image display performance to be degraded.

However, even in this case, it is not always possible to satisfactorily remove unwanted light caused by reflection at a reflecting area outside the effective area of the second surface of the above-described modified prism, which becomes flare or ghost, and also unwanted external light that enters the modified prism through a transmitting area outside the effective area of the first surface, which faces the image display device, and forms flare or ghost.

SUMMARY OF THE INVENTION

In view of the above-described problems associated with the prior art, an object of the present invention is to provide an image display apparatus having as an ocular optical system a modified prism formed from at least three decentered surfaces including a reflecting surface, in which unwanted light caused by reflection or transmission at an area outside the effective area of a reflecting or transmitting surface is reduced to provide a favorable image of high resolution, which is free from flare or ghost.

To attain the above-described object, the present invention provides an image display apparatus having an image display device and an ocular optical system that leads an image formed by the image display device so that the image is observed as a virtual image. The ocular optical system has a prism member formed from a medium having a refractive index (n) larger than 1 (n>1). The prism member includes a first surface having an action through which a light beam enters the prism member, a second surface having an action by which the light beam is reflected in the prism member, and a third surface having an action through which the light beam exits from the prism member. An antireflection member having a flare- or ghost-preventing action is provided over a part of a non-effective reflecting area of at least the second surface, exclusive of an effective reflecting area (an area reflecting an effective light beam that forms the virtual image).

In addition, the present invention provides an image display apparatus having an image display device and an ocular optical system that leads an image formed by the image display device so that the image is observed as a virtual image. The ocular optical system has a prism member formed from a medium having a refractive index (n) larger than 1 (n>1). The prism member includes a first surface having an action through which a light beam enters the prism member, a second surface having an action by which the light beam is reflected in the prism member, and a third surface having an action through which the light beam exits from the prism member. A light-blocking member having a flare- or ghost-preventing action is provided over a part of a non-effective transmitting area of at least the first surface, exclusive of an effective transmitting area (an area transmitting an effective light beam that forms the virtual image).

In addition, the present invention provides an image display apparatus having an image display device and an ocular optical system that leads an image formed by the image display device so that the image is observed as a virtual image. The ocular optical system has a prism member formed from a medium having a refractive index (n) larger than 1 (n>1). The prism member includes a first surface having an action through which a light beam enters the prism member, a second surface having an action by which the light beam is reflected in the prism member, a third surface having an action by which the light beam is internally reflected and further having an action through which the light beam exits from the prism member, and a fourth surface placed in an optical path between the first surface and the third surface and having an action by which the light beam is reflected in the prism member. An antireflection member having a flare- or ghost-preventing action is provided over a part of a non-effective area of at least the third surface, exclusive of an effective reflecting area (an area reflecting an effective light beam that forms the virtual image) and an effective transmitting area (an area transmitting the effective light beam).

According to the present invention, an antireflection member or a light-blocking member, which has a flare- or ghost-preventing action, is provided over a non-effective area outside the effective reflecting or transmitting area of a reflecting or transmitting surface of a prism member used as an ocular optical system of an image display apparatus. Therefore, it is possible to reduce unwanted light caused by reflection or transmission at the non-effective area of the reflecting or transmitting surface and hence possible to provide an image display apparatus of favorable resolution, which is free from flare or ghost.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Some embodiments of the image display apparatus according to the present invention will be described below.

Figure 1A:
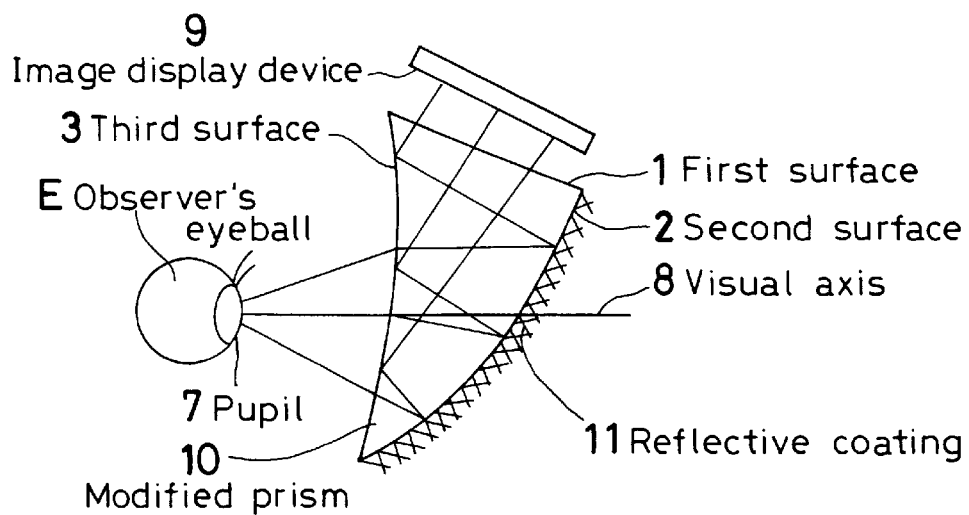
FIG. 1 is a ray path diagram illustrating the location of an antireflection member in an image display apparatus according to one embodiment of the present invention.
Figure 1B:
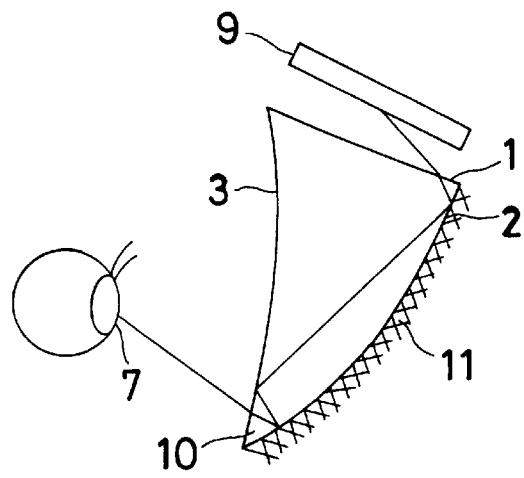
Figure 1C:
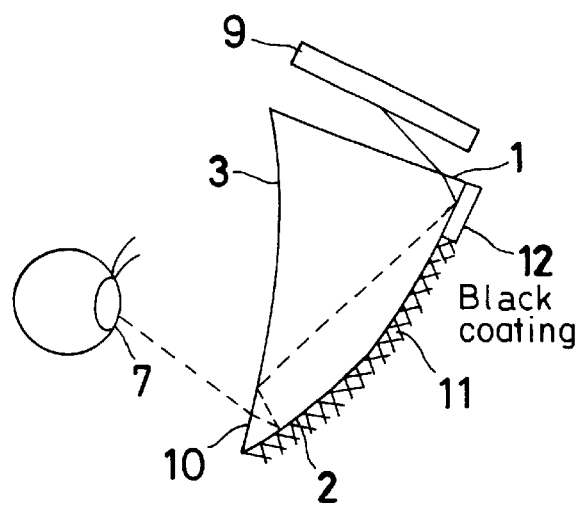

Part (a) of FIG. 1 shows a ray path diagram of an optical system of an image display apparatus disclosed in Japanese Patent Application Unexamined Publication (KOKAI) No. 8-313829, filed by the present applicant. In this image display apparatus, a modified prism 10 having three optical surfaces 1 to 3 is used as an ocular optical system. The optical surfaces 1 to 3 of the modified prism 10 are each decentered with respect to an observer's visual axis 8. A space formed by the three surfaces 1 to 3 is filled with an optically transparent medium having a refractive index larger than 1. Let us assume that a surface through which light emitted from an image display device 9 enters the modified prism 10 is a first surface 1, a reflecting surface opposite to an observer's eyeball E is a second surface 2, and a surface close to the observer's eyeball E is a third surface 3. Light rays emitted from the image display device 9 enter the modified prism 10 while being refracted through the first surface 1. The rays are internally reflected by the third surface 3 toward the second surface 2. The reflected rays are internally reflected by the second surface 2 toward the third surface 3. Then, the reflected rays exit from the modified prism 10 while being refracted through the third surface 3 and reach the pupil 7 of the observer's eyeball E. The second surface 2 as a reflecting surface of the modified prism 10 is provided with a reflective coating 11 to form a back-coated mirror.

In the image display apparatus, a path such as that shown in part (b) of FIG. 1 is present in addition to the normal path of display light, which is shown in part (a) of FIG. 1. That is, light emanating from the image display device 9 at a relatively large angle and entering the modified prism 10 through the first surface 1 reaches an area of the second surface 2 that is outside the effective reflecting area and closer to the first surface 1. The light is reflected from the non-effective area of the second surface 2 and impinges on the third surface 3 at a large incident angle. The incident light is totally reflected by the third surface 3 to reach an area of the second surface 2 that is outside the effective reflecting area and remote from the first surface 1. The light is reflected by the non-effective area of the second surface 2. The reflected light passes through the third surface 3 and reaches the pupil 7 of the observer's eyeball E, forming ghost light.

Figure 2A:
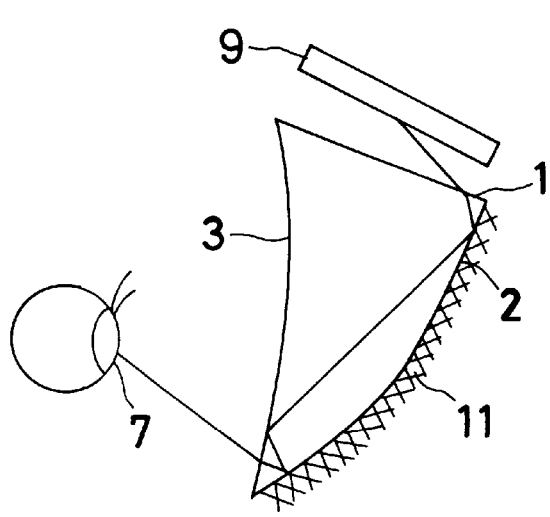
FIG. 2 is a ray path diagram illustrating a modification of the arrangement shown in FIG. 1.
Figure 2B:
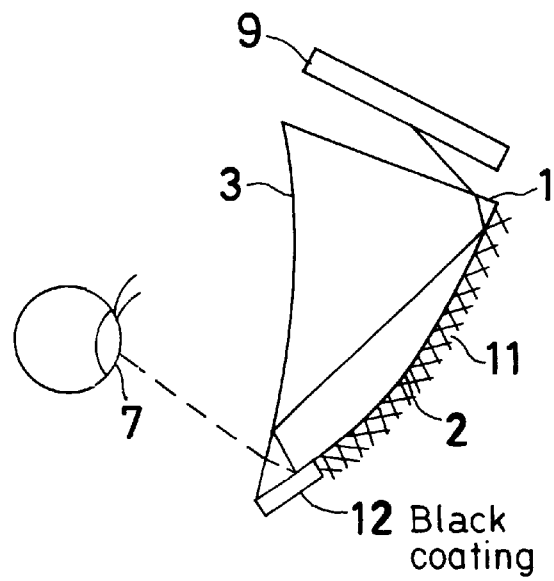

Therefore, according to the present invention, the non-effective area of the second surface 2 that is outside the effective reflecting area and closer to the first surface 1 is provided with a black coating 12, as shown in part (c) of FIG. 1, instead of providing the reflective coating 11. Alternatively, the reflective coating 11 is removed from the non-effective area, and a black coating 12 is provided on the non-effective area in place of the reflective coating 11. By doing so, the unwanted light is absorbed in the non-effective area. Alternatively, as shown in part (b) of FIG. 2, a black coating 12 may similarly be provided on the non-effective area of the second surface 2 that is outside the effective reflecting area and remote from the first surface 1. It is also possible to use both the black coating 12 on the non-effective area shown in part (c) of FIG. 1 and the black coating 12 on the non-effective area shown in part (b) of FIG. 2. It should be noted that part (a) of FIG. 2 is similar to part (b) of FIG. 1.

The black coating 12 used in this embodiment is a black coating material having an absorptance higher than the reflectivity thereof. It is desirable that the refractive index of the black coating material be approximately equal to the refractive index of the modified prism 10.

Figure 3A:
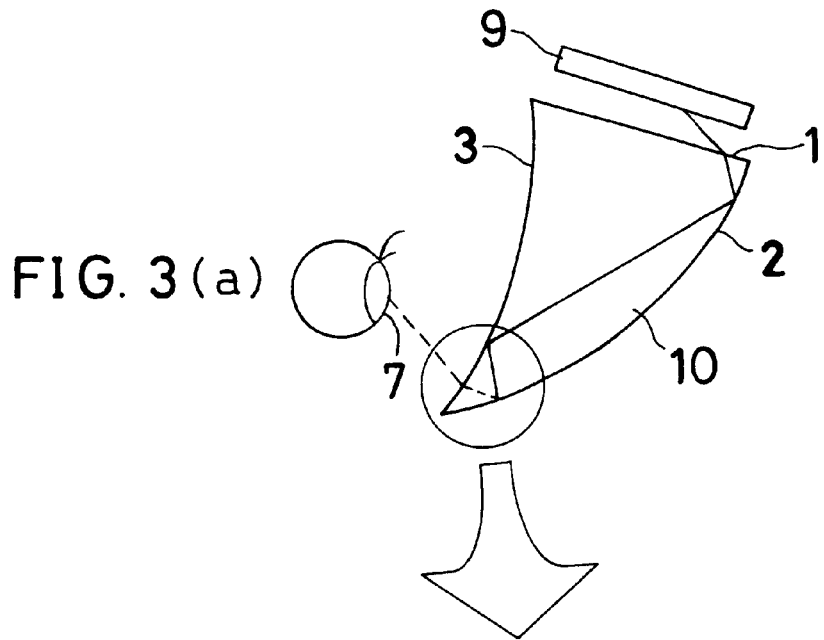
FIG. 3 is a diagram illustrating a modification of the antireflection member.
Figure 3B:
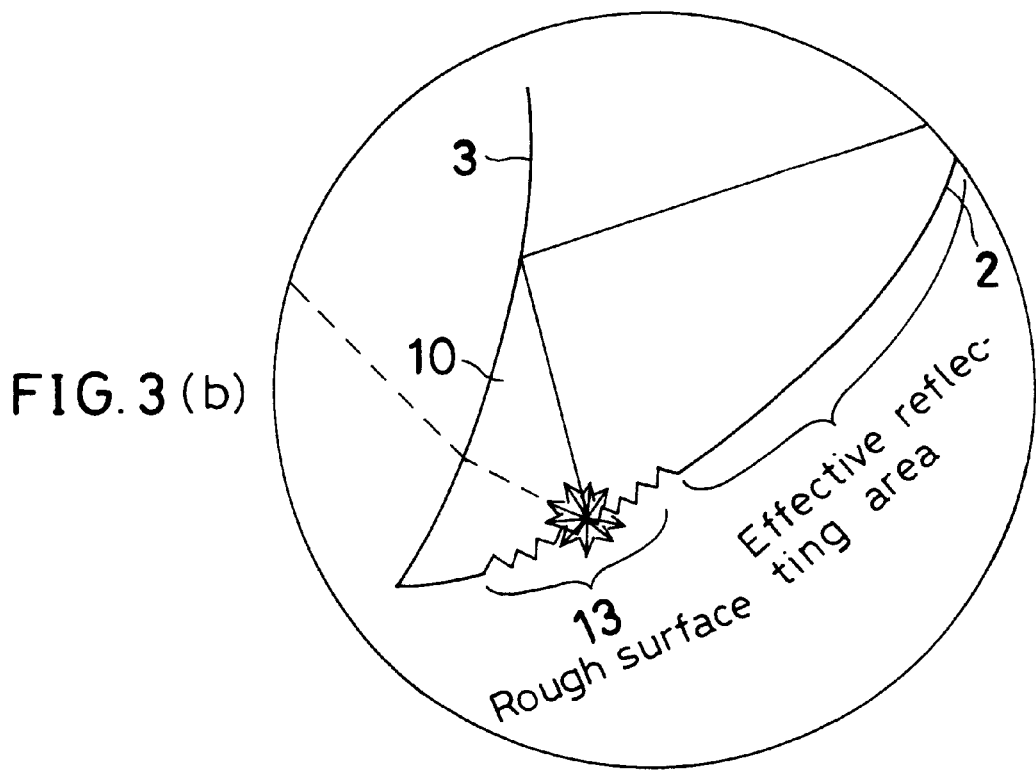

It should be noted that either or both of the non-effective reflecting area of the second surface 2 closer to the first surface 1 and the non-effective reflecting area of the second surface 2 remote from the first surface 1 may be roughened to form a rough surface 13 as shown in FIG. 3 so as to scatter unwanted light incident thereon, thereby reducing the quantity of flare or ghost light, instead of absorbing unwanted light by the black coating 12 as stated above (in the case of FIG. 3, only the non-effective reflecting area of the second surface 2 remote from the first surface 1 is formed into a rough surface 13). Provision of such a rough surface 13 is also effective. If the rough surface 13 is coated with a black coating material as stated above, an even more powerful effect can be obtained. It should be noted that a finely corrugated surface may be used in place of the rough surface 13 as a scattering surface. It is also possible to use an antireflection coating of a medium having a refractive index larger than 1 in place of the black coating 12 or the rough surface 13.

Figure 4A:
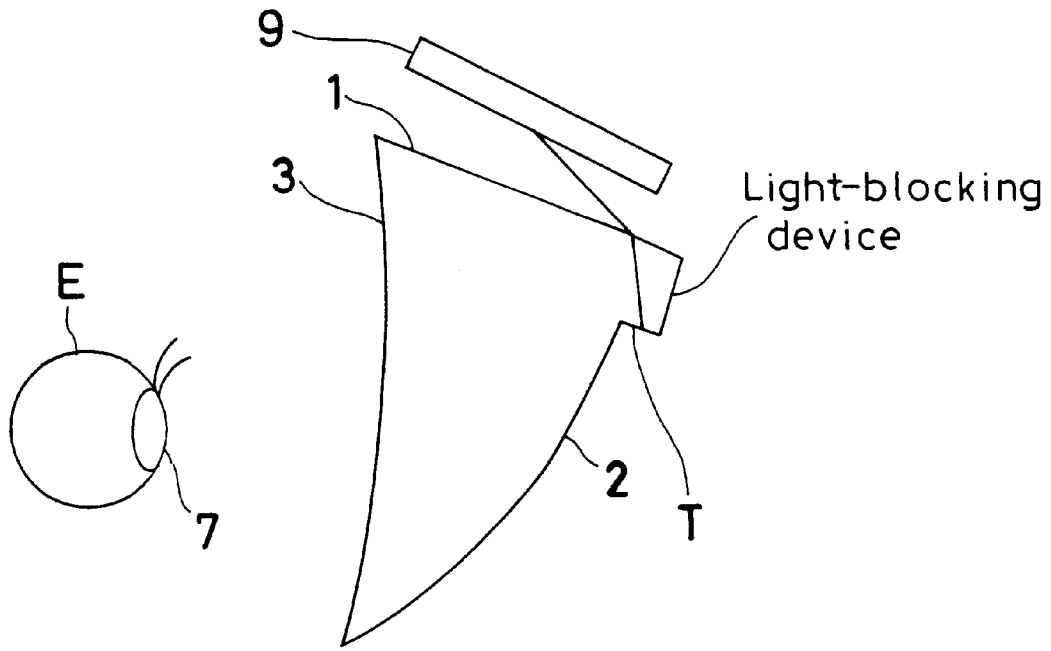
FIG. 4 is a diagram illustrating another modification of the antireflection member.
Figure 4B:
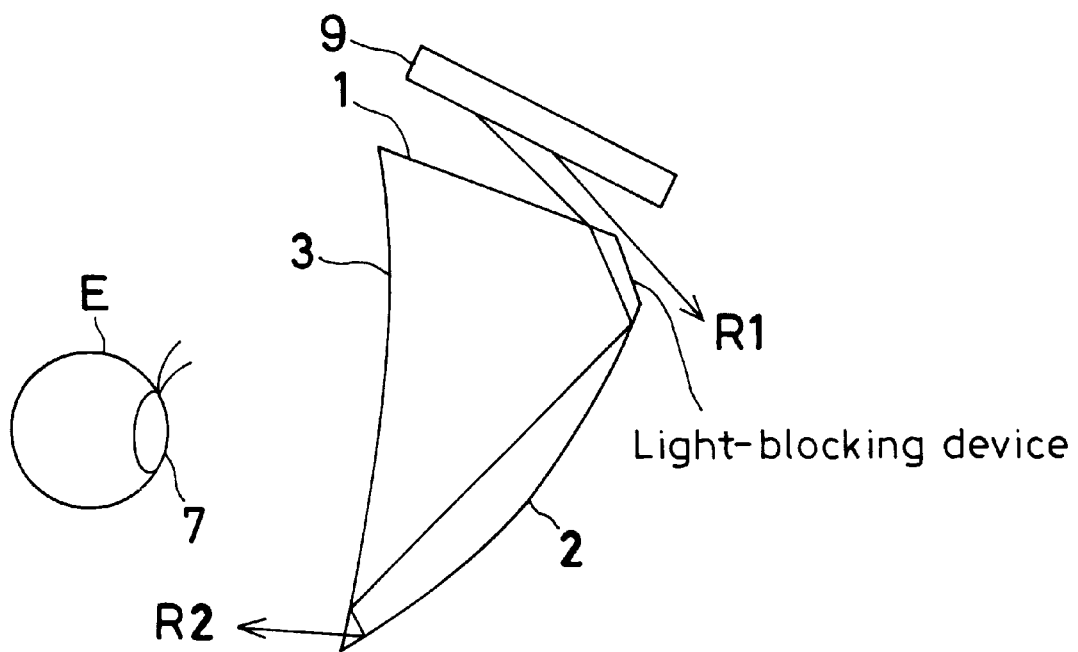

It should be noted that, as shown in part (a) of FIG. 4, a non-effective reflecting area of the second surface 2 may be formed as a discontinuous portion so that light that would otherwise be reflected at this portion is trapped by a bottom surface T as shown in part (a) of FIG. 4, thereby preventing the occurrence of ghost, instead of using the black coating 12, the rough surface 13 or the antireflection coating of a medium having a refractive index larger than 1.

The non-effective reflecting area of the second surface 2 may be given a tilt different from the tilt of the effective reflecting area as shown in part (b) of FIG. 4, thereby cutting off ghost light R1 that would otherwise be incident on the second surface 2 as shown in part (b) of FIG. 4. The tilt angle of the surface is so set that ghost light that is not cut off will not be reflected at the non-effective reflecting area. In this case, there is light R2 that is reflected at the effective reflecting area to travel toward the eyeball E. However, because the point of reflection at the second surface 2 is on the lower side as viewed in the figure, the light R2 reaches a point lower than the observer's eyeball E. Consequently, no ghost image can be seen by the observer. Accordingly, it is possible to prevent ghost.

It should be noted that the configuration of the modified prism 10 used as an ocular optical system of the image display apparatus according to the present invention is not necessarily limited to that shown in part (a) of FIG. 1. In the case of modified prisms 10 such as those shown in FIGS. 5 and 8 to 15 (described later), it is also desirable to provide the black coating 12, the rough surface 13 or the antireflection coating on an area outside the effective reflecting area as in the case of FIGS. 1 to 3.

Figure 5A:
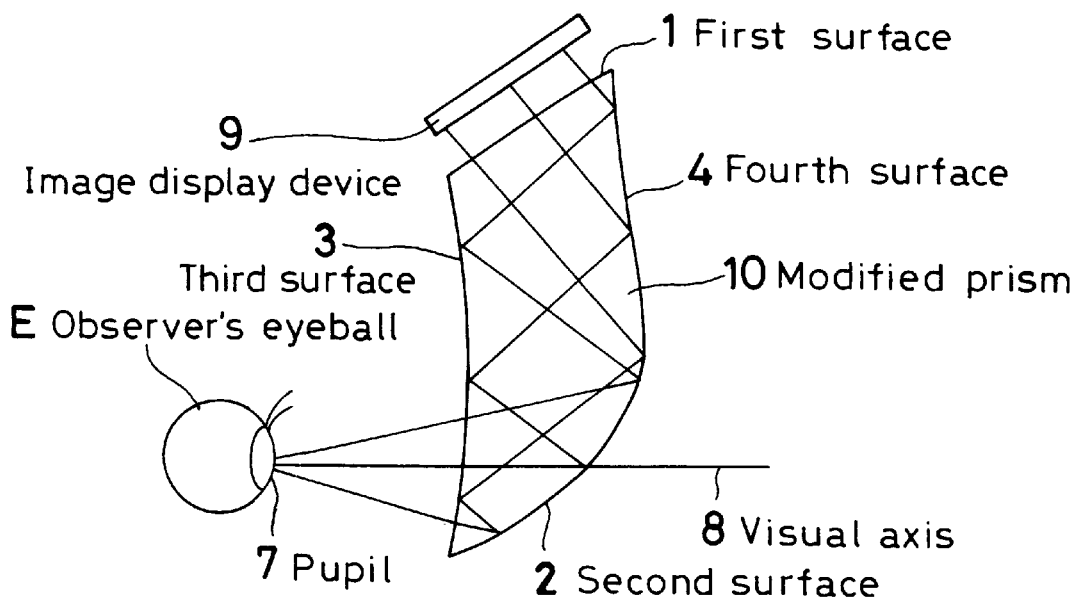
FIG. 5 is a ray path diagram illustrating the location of an antireflection member in an image display apparatus according to another embodiment of the present invention.
Figure 5B:
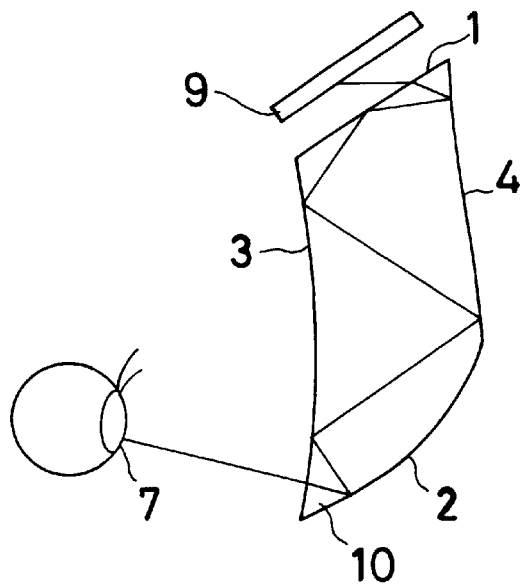
Figure 5C:
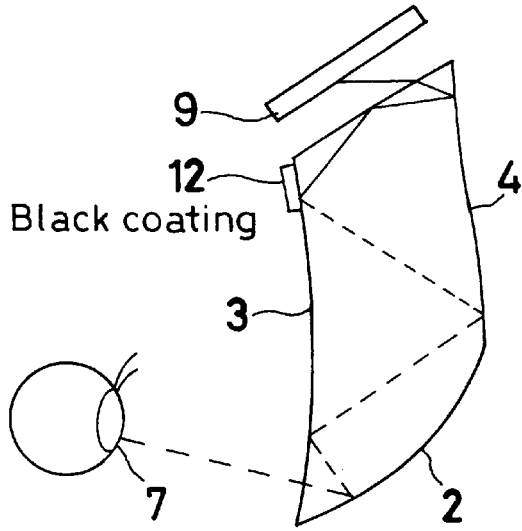

In addition, the black coating 12, the rough surface 13 or the antireflection coating is also effective in a case where a modified prism 10 such as that shown in part (a) of FIG. 5 is used as an ocular optical system of an image display apparatus. In part (a) of FIG. 5, a modified prism 10 has four surfaces 1 to 4 each decentered with respect to an observer's visual axis 8. A space formed by the four surfaces 1 to 4 is filled with an optically transparent medium having a refractive index larger than 1. Let us assume that a surface through which light emitted from an image display device 9 enters the modified prism 10 is a first surface 1, a reflecting surface opposite to an observer's eyeball E is a second surface 2, a surface close to the observer's eyeball E is a third surface 3, and a reflecting surface located between the first surface 1 and the second surface 2 to face the third surface 3 is a fourth surface 4. Light rays emitted from the image display device 9 enter the modified prism 10 while being refracted through the first surface 1. The rays are internally reflected by the fourth surface 4 toward the third surface 3. The reflected rays are internally reflected by the third surface 3 toward the second surface 2. The reflected rays are internally reflected by the second surface 2 toward the third surface 3. Then, the reflected rays exit from the modified prism 10 while being refracted through the third surface 3 and reach the pupil 7 of the observer's eyeball E. The third surface 3 is a totally reflecting surface.

In the image display apparatus, a path such as that shown in part (b) of FIG. 5 is present in addition to the normal path of display light, which is shown in part (a) of FIG. 5. That is, light emanating from the image display device 9 at a relatively large angle and entering the modified prism 10 through the first surface 1 is reflected by the fourth surface 4 to return to the first surface 1. The reflected light is incident on the first surface 1 at a large incident angle and thus totally reflected thereby. Thereafter, the reflected light reaches an area of the third surface 3 that is outside the effective reflecting area and closer to the first surface 1. The light is reflected from the non-effective area of the third surface 3 and impinges on the fourth surface 4. The light is reflected by the fourth surface 4 and impinges on the third surface 3 again at a large incident angle. The incident light is totally reflected by the third surface 3 to reach the second surface 2. The light is reflected by the second surface 2, passes through the third surface 3 and reaches the pupil 7 of the observer's eyeball E, forming ghost light.

Therefore, according to the present invention, the non-effective area of the third surface 3 that is outside the effective reflecting area and closer to the first surface 1 is provided with a black coating 12 such as that stated above, as shown in part (c) of FIG. 5, so that total reflection does not take place at the non-effective area of the third surface 3. By doing so, the unwanted light is absorbed in the non-effective area. In this case also, a black coating 12 may be provided on another non-effective reflecting area of the third surface 3 or on a non-effective reflecting area of another surface. Alternatively, a rough surface 13 such as that stated above may be provided in place of the black coating 12. It is also possible to use an antireflection coating.

In the foregoing embodiments, an area outside the effective reflecting area of a reflecting surface of the modified prism 10 is provided with an antireflection member, e.g. the black coating 12, the rough surface 13 or the antireflection coating. It should be noted that an effective way of eliminating flare or ghost light is to cut off unwanted light by providing a light-blocking member on an area outside the effective transmitting area of the first surface 1, which is an entrance surface through which light emitted from the image display device 9 enters the modified prism 10. The effective transmitting area is an area through which the normal display light passes.

Figure 6A:
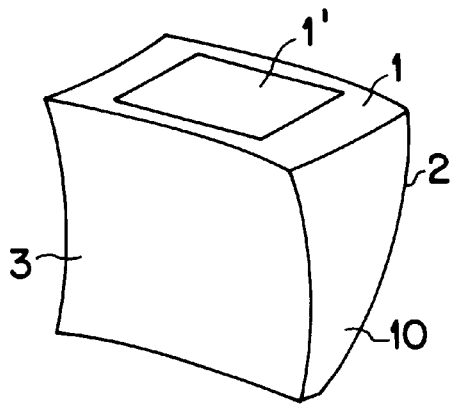
FIG. 6 is a perspective view illustrating the location of a light-blocking member in an image display apparatus according to one embodiment of the present invention.
Figure 6B:
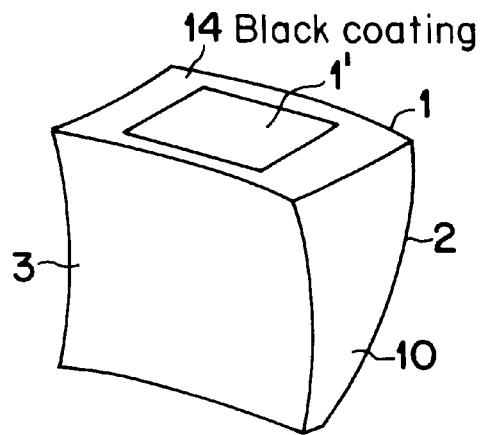
Figure 7A:
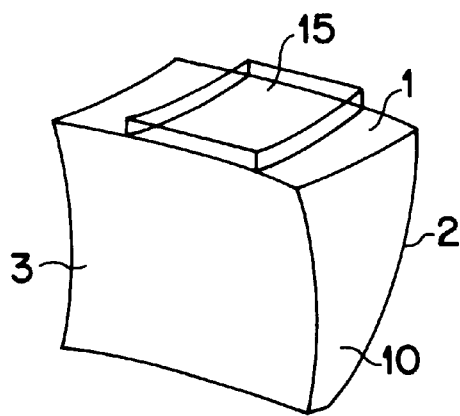
FIG. 7 is a perspective view illustrating a modification of the arrangement shown in FIG. 6.
Figure 7B:
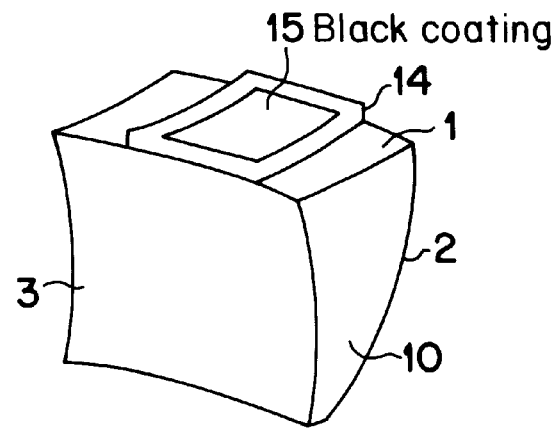
Figure 7C:
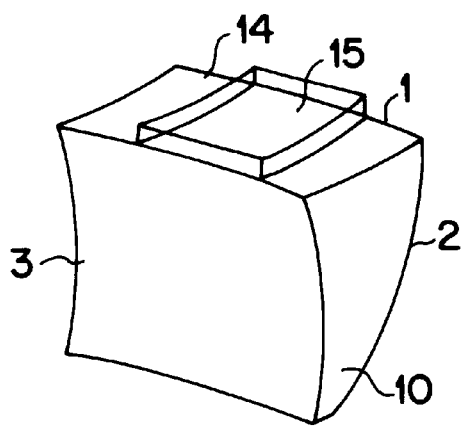
Figure 7D:
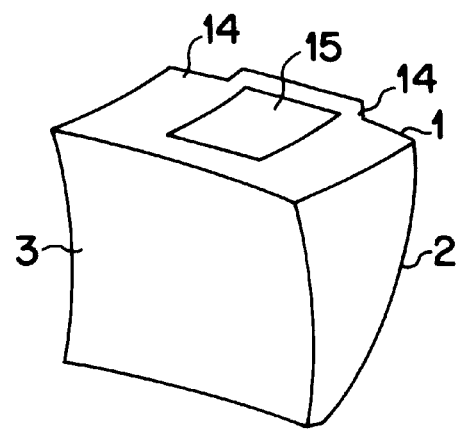

FIG. 6 is a diagram illustrating one embodiment of the above-described arrangement. Part (a) of FIG. 6 is a perspective view showing the modified prism 10 described above in connection with FIG. 1. The first surface 1 of the modified prism 10 is a surface close to the image display device 9. The first surface 1 has an effective transmitting area 1' with a rectangular shape approximately coincident with the contour of the display area of the image display device 9. Light incident on an area outside the effective transmitting area 1' causes flare or ghost. Therefore, according to the present invention, the area outside the effective transmitting area 1' of the first surface 1 is provided with a black coating 14 as a light-blocking member, thereby cutting off unwanted light effectively. As the black coating 14, it is desirable to use a black coating material having an absorptance higher than the transmittance thereof.

FIG. 7 shows a modification of the arrangement shown in FIG. 6. As shown in part (a) of FIG. 7, a transparent plate 15 having a rectangular shape approximately coincident with the contour of the display area of the image display device 9 is prepared, and the outer periphery of the transparent plate 15 is provided with a black coating 14. As shown in part (b) of FIG. 7, the transparent plate 15 is bonded to the first surface 1 of the modified prism 10 so that display light from the image display device 9 is incident on the first surface 1 through the transparent plate 15. This arrangement also makes it possible to cut off unwanted light emitted from the image display device 9.

It is also possible to cut off unwanted external light by providing a black coating 14 on the area of the first surface 1 outside the transparent plate 15 bonded thereto, as shown in part (c) of FIG. 7, instead of providing the black coating 14 on the outer periphery of the transparent plate 15.

Unwanted light can be cut off even more effectively by providing a black coating 14 on the outer periphery of the transparent plate 15 and further providing a black coating 14 on the area of the first surface 1 outside the transparent plate 15, as shown in part (d) of FIG. 7.

The antireflection member and the light-blocking member, described above in connection with FIGS. 1 to 7, are also applicable to modified prisms 10 described below, for example, in addition to the modified prisms 10 shown in FIGS. 1 and 5.

Figure 8:
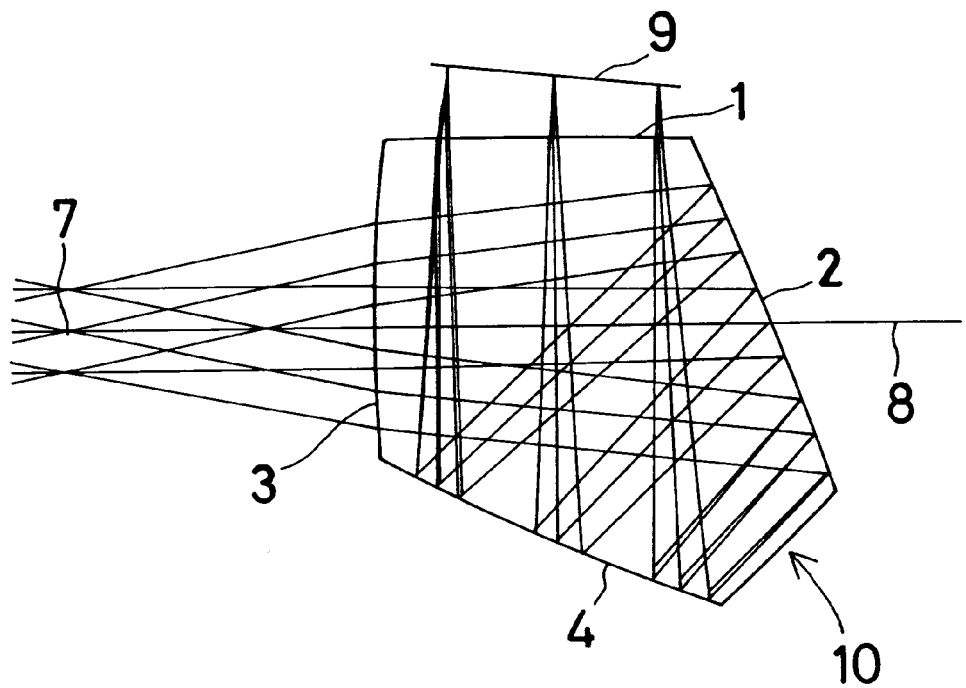
FIG. 8 is a diagram illustrating an optical path of another modified prism to which an antireflection member and light-blocking member according to the present invention are applicable.

FIG. 8 shows a modified prism 10 used as an ocular optical system of an image display apparatus. The modified prism 10 is a decentered prism member having four optical surfaces 1 to 4. A space formed by the optical surfaces 1 to 4 is filled with a medium having a refractive index larger than 1. Display light from an image display device 9 enters the modified prism 10 through a first surface 1, which is a transmitting surface placed to face opposite to the image display device 9. The light is incident on a fourth surface 4, which is a decentered reflecting surface. The light is reflected by the fourth surface 4 and impinges on a second surface 2, which is a decentered reflecting surface placed on an observer's visual axis 8 to face opposite to a pupil 7 of an observer's eye. The light is reflected by the second surface 2. The reflected light crosses the light incident on the fourth surface 4 and exits from the modified prism 10 through a third surface 3, which is a transmitting surface placed on the observer's visual axis 8 between the second surface 2 and the observer's pupil 7. Then, the light travels along the observer's visual axis 8, enter the observer's pupil 7 without forming an intermediate image, and forms an image on the retina of the observer's eye.

Figure 9:
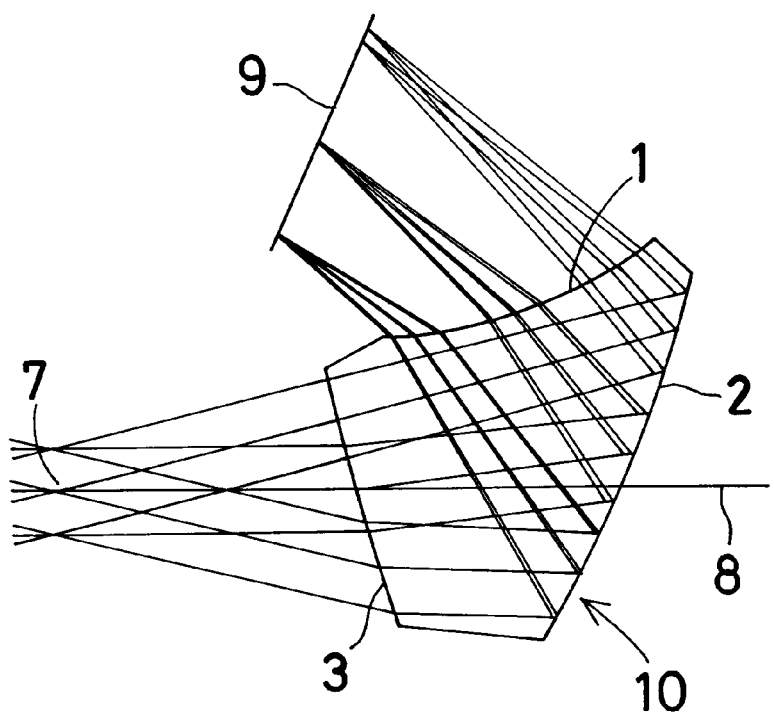
FIG. 9 is a diagram illustrating an optical path of another modified prism to which an antireflection member and light-blocking member according to the present invention are applicable.

FIG. 9 shows a modified prism 10 used as an ocular optical system of an image display apparatus. The modified prism 10 is a decentered prism member having three optical surfaces 1 to 3. A space formed by the optical surfaces 1 to 3 is filled with a medium having a refractive index larger than 1. Display light from an image display device 9 enters the modified prism 10 through a first surface 1, which is a transmitting surface placed to face opposite to the image display device 9. The light is incident on a second surface 2, which is a decentered reflecting surface. The light is reflected by the second surface 2 and exits from the modified prism 10 through a third surface 3, which is a transmitting surface placed on an observer's visual axis 8 between the second surface 2 and a pupil 7 of an observer's eye. Then, the light travels along the observer's visual axis 8, enters the observer's pupil 7 without forming an intermediate image, and forms an image on the retina of the observer's eye.

Figure 10:
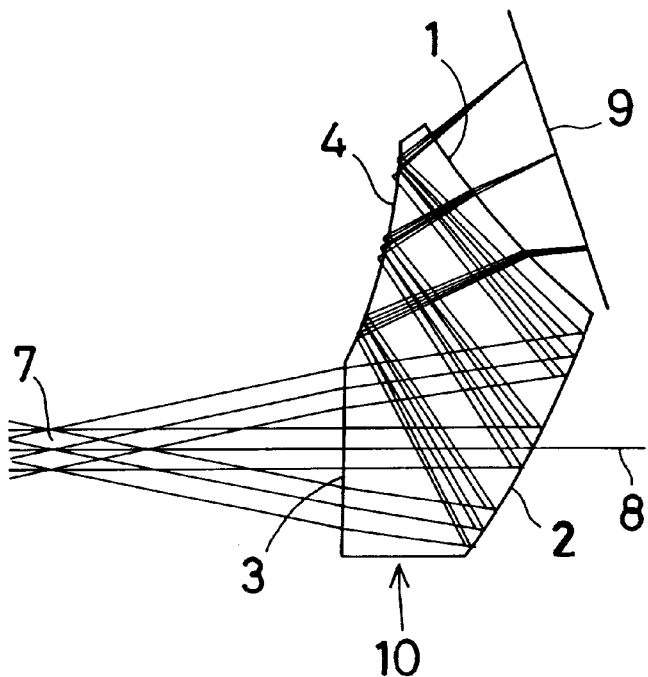
FIG. 10 is a diagram illustrating an optical path of another modified prism to which an antireflection member and light-blocking member according to the present invention are applicable.

FIG. 10 shows a modified prism 10 used as an ocular optical system of an image display apparatus. The modified prism 10 is a decentered prism member having four optical surfaces 1 to 4. A space formed by the optical surfaces 1 to 4 is filled with a medium having a refractive index larger than 1. Display light from an image display device 9 enters the modified prism 10 through a first surface 1, which is a transmitting surface placed to face opposite to the image display device 9. The light is incident on a fourth surface 4, which is a decentered reflecting surface. The light is reflected by the fourth surface 4 and impinges on a second surface 2, which is a decentered reflecting surface placed on an observer's visual axis 8 to face opposite to a pupil 7 of an observer's eye. The light is reflected by the second surface 2 and exits from the modified prism 10 through a third surface 3, which is a transmitting surface placed on the observer's visual axis 8 between the second surface 2 and the observer's pupil 7. Then, the light travels along the observer's visual axis 8, enters the observer's pupil 7 without forming an intermediate image, and forms an image on the retina of the observer's eye.

Figure 11:
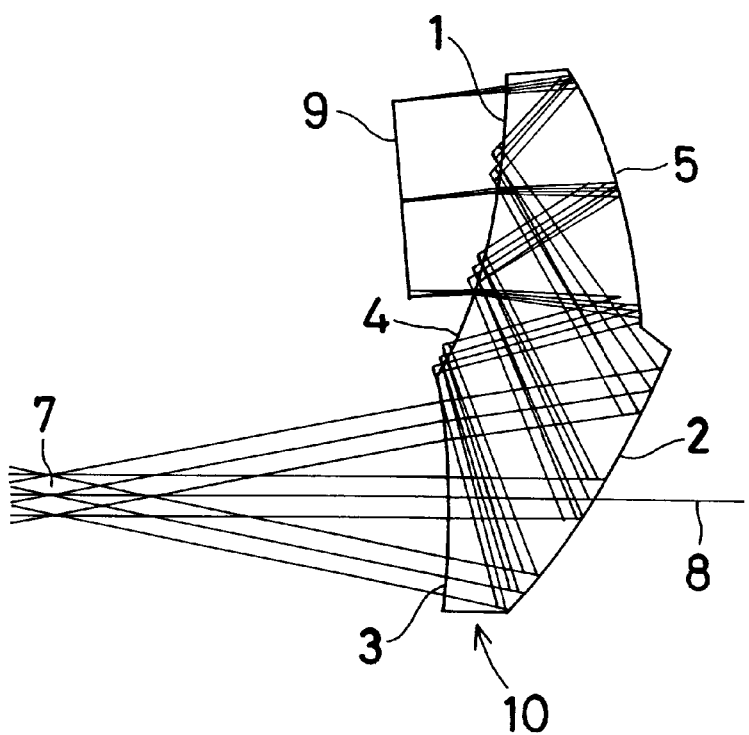
FIG. 11 is a diagram illustrating an optical path of another modified prism to which an antireflection member and light-blocking member according to the present invention are applicable.

FIG. 11 shows a modified prism 10 used as an ocular optical system of an image display apparatus. The modified prism 10 is a decentered prism member having four optical surfaces 1 to 3 and 5. A space formed by the optical surfaces 1 to 3 and 5 is filled with a medium having a refractive index larger than 1. Display light from an image display device 9 enters the modified prism 10 through a first surface 1, which is transmitting surface placed to face opposite to the image display device 9. The light is incident on a fifth surface 5, which is a reflecting surface. The light is reflected by the fifth surface 5 and impinges on a fourth surface 4, which is a reflecting surface formed by the same surface as the first surface 1. That is, the first surface 1 serves as both transmitting and reflecting surfaces. The light is reflected by the fourth surface 4 and impinges on a second surface 2, which is a decentered reflecting surface placed on an observer's visual axis 8 to face opposite to a pupil 7 of an observer's eye. The light is reflected by the second surface 2 and exits from the modified prism 10 through a third surface 3, which is a transmitting surface placed on the observer's visual axis 8 between the second surface 2 and the observer's pupil 7. Then, the light travels along the observer's visual axis 8, enters the observer's pupil 7 without forming an intermediate image, and forms an image on the retina of the observer's eye.

Figure 12:
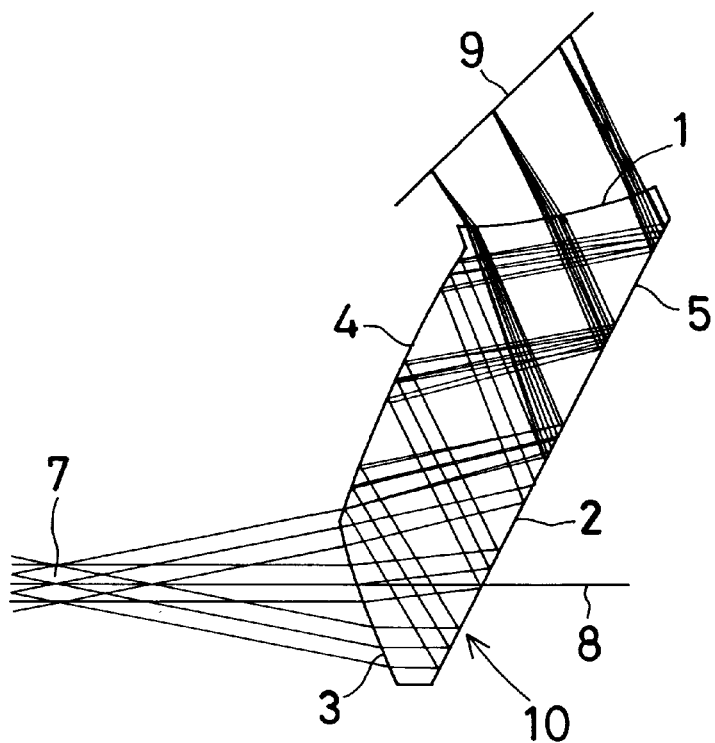
FIG. 12 is a diagram illustrating an optical path of another modified prism to which an antireflection member and light-blocking member according to the present invention are applicable.

FIG. 12 shows a modified prism 10 used as an ocular optical system of an image display apparatus. The modified prism 10 is a decentered prism member having four optical surfaces 1 to 4. A space formed by the optical surfaces 1 to 4 is filled with a medium having a refractive index larger than 1. Display light from an image display device 9 enters the modified prism 10 through a first surface 1, which is a transmitting surface placed to face opposite to the image display device 9. The light is incident on a fifth surface 5, which is a reflecting surface formed by the same surface as a second surface 2. The second surface 2 is a decentered reflecting surface placed on an observer's visual axis 8 to face opposite to a pupil 7 of an observer's eye. The light is reflected by the fifth surface 5 and impinges on a fourth surface 4, which is a reflecting surface. The light is reflected by the fourth surface 4 and impinges on the second surface 2, which is a decentered reflecting surface placed on the observer's visual axis 8 to face opposite to the observer's pupil 7. The light is reflected by the second surface 2 and exits from the modified prism 10 through a third surface 3, which is a transmitting surface placed on the observer's visual axis 8 between the second surface 2 and the observer's pupil 7. Then, the light travels along the observer's visual axis 8, enters the observer's pupil 7 without forming an intermediate image, and forms an image on the retina of the observer's eye.

Figure 13:
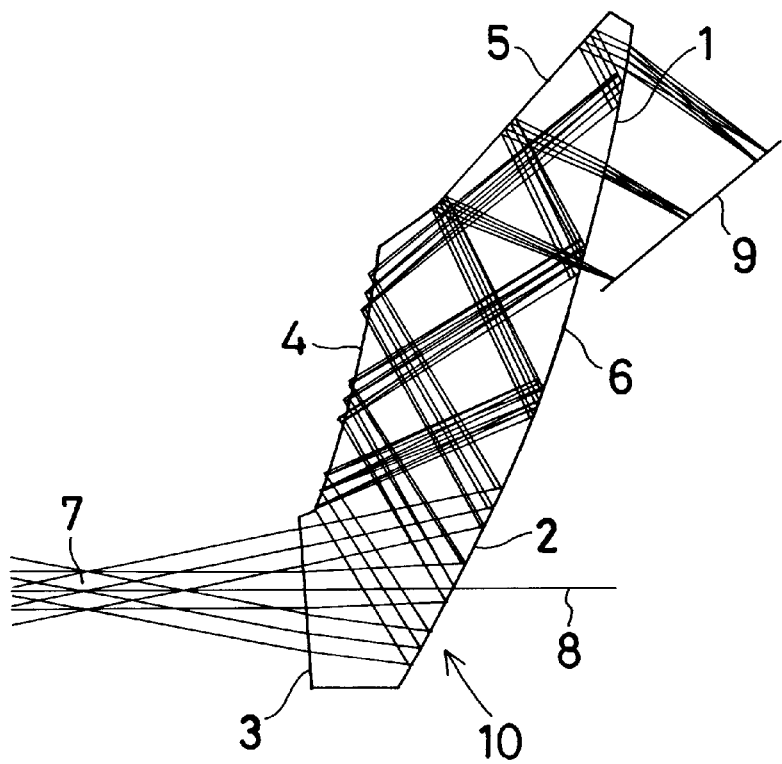
FIG. 13 is a diagram illustrating an optical path of another modified prism to which an antireflection member and light-blocking member according to the present invention are applicable.

FIG. 13 shows a modified prism 10 used as an ocular optical system of an image display apparatus. The modified prism 10 is a decentered prism member having four optical surfaces 2 to 5. A space formed by the optical surfaces 2 to 5 is filled with a medium having a refractive index larger than 1. Display light from an image display device 9 enters the modified prism 10 through a first surface 1, which is a transmitting surface placed to face opposite to the image display device 9. The first surface 1 is formed by the same surface as a second surface 2, which is a decentered reflecting surface placed on an observer's visual axis 8 to face opposite to a pupil 7 of an observer's eye. The light is incident on a fifth surface 5, which is a reflecting surface. The light is reflected by the fifth surface 5 and impinges on a sixth surface 6, which is a reflecting surface formed by the same surface as the second surface 2. The light is reflected by the sixth surface 6 and impinges on a fourth surface 4, which is a reflecting surface. The light is reflected by the fourth surface 4 and impinges on the second surface 2, which is a decentered reflecting surface placed on the observer's visual axis 8 to face opposite to the observer's pupil 7. The light is reflected by the second surface 2 and exits from the modified prism 10 through a third surface 3, which is a transmitting surface placed on the observer's visual axis 8 between the second surface 2 and the observer's pupil 7. Then, the light travels along the observer's visual axis 8, enters the observer's pupil 7 without forming an intermediate image, and forms an image on the retina of the observer's eye.

Figure 14:
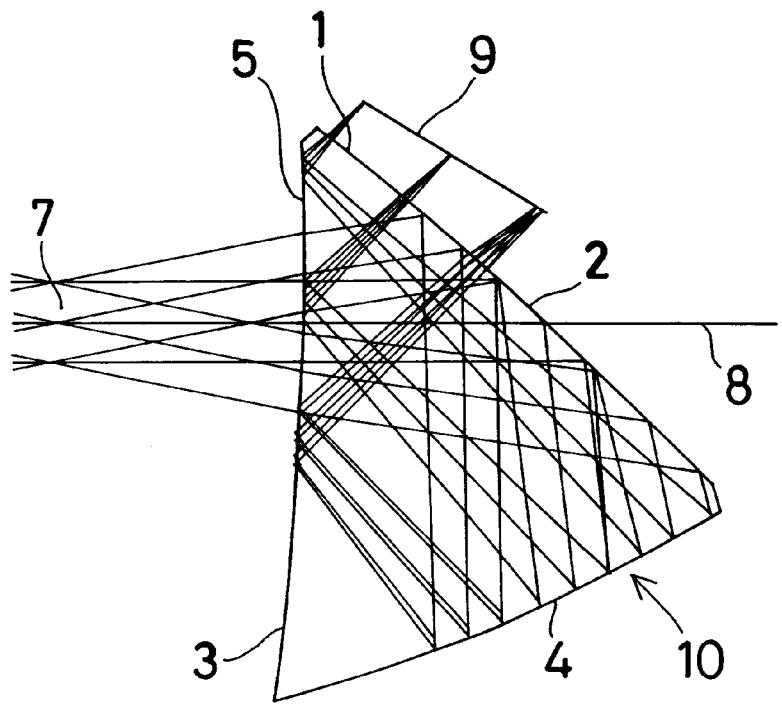
FIG. 14 is a diagram illustrating an optical path of another modified prism to which an antireflection member and light-blocking member according to the present invention are applicable.

FIG. 14 shows a modified prism 10 used as an ocular optical system of an image display apparatus. The modified prism 10 is a decentered prism member having three optical surfaces 2 to 4. A space formed by the optical surfaces 2 to 4 is filled with a medium having a refractive index larger than 1. Display light from an image display device 9 enters the modified prism 10 through a first surface 1, which is a transmitting surface placed to face opposite to the image display device 9. The first surface 1 is formed by the same surface as a second surface 2, which is a decentered reflecting surface placed on an observer's visual axis 8 to face opposite to a pupil 7 of an observer's eye. The light is incident on a fifth surface 5, which is a reflecting surface formed by the same surface as a third surface 3 placed on the observer's visual axis 8 between the second surface 2 and the observer's pupil 7. The light is reflected by the fifth surface 5 and impinges on a fourth surface 4, which is a reflecting surface. The light is reflected by the fourth surface 4 and impinges on the second surface 2, which is a decentered reflecting surface placed on the observer's visual axis 8 to face opposite to the observer's pupil 7. The light is reflected by the second surface 2. The reflected light crosses the light reflected by the fifth surface 5 and exits from the modified prism 10 through the third surface 3, which is a transmitting surface placed on the observer's visual axis 8 between the second surface 2 and the observer's pupil 7. Then, the light travels along the observer's visual axis 8, enters the observer's pupil 7 without forming an intermediate image, and forms an image on the retina of the observer's eye.

Figure 15:
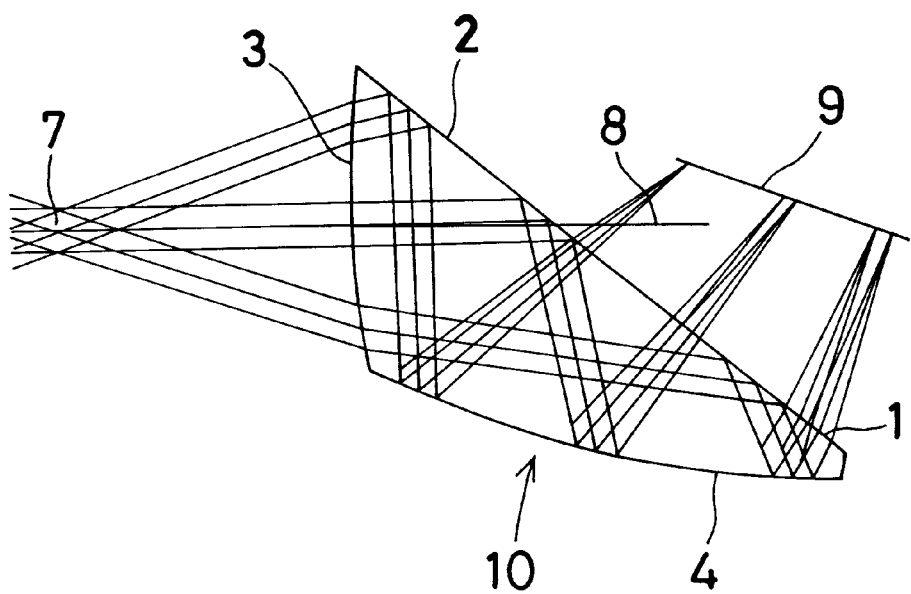
FIG. 15 is a diagram illustrating an optical path of another modified prism to which an antireflection member and light-blocking member according to the present invention are applicable.

FIG. 15 shows a modified prism 10 used as an ocular optical system of an image display apparatus. The modified prism 10 is a decentered prism member having three optical surfaces 2 to 4. A space formed by the optical surfaces 2 to 4 is filled with a medium having a refractive index larger than 1. Display light from an image display device 9 enters the modified prism 10 through a first surface 1, which is a transmitting surface placed to face opposite to the image display device 9. The first surface 1 is formed by the same surface as a second surface 2, which is a decentered reflecting surface placed on an observer's visual axis 8 to face opposite to a pupil 7 of an observer's eye. The light is incident on a fourth surface 4, which is a reflecting surface. The light is reflected by the fourth surface 4 and impinges on the second surface 2, which is a decentered reflecting surface placed on the observer's visual axis 8 to face opposite to the observer's pupil 7. The light is reflected by the second surface 2 and exits from the modified prism 10 through a third surface 3, which is a transmitting surface placed on the observer's visual axis 8 between the second surface 2 and the observer's pupil 7. Then, the light travels along the observer's visual axis 8, enters the observer's pupil 7 without forming an intermediate image, and forms an image on the retina of the observer's eye.

Incidentally, in the modified prisms 10 shown in FIGS. 1 to 15, the first surface 1, through which display light from the image display device 9 enters the modified prism 10, and the third surface 3, through which light exits from the modified prism 10 to enter the pupil 7, are formed from separate surfaces. However, the first surface 1 and the third surface 3 may be formed by the same surface. One example of this arrangement is shown in part (a) of FIG. 16. In this example, a modified prism 10 used as an ocular optical system of an image display apparatus is a decentered prism member having two optical surfaces 1 and 2. A space formed by the optical surfaces 1 and 2 is filled with a medium having a refractive index larger than 1. Display light from an image display device 9 enters the modified prism 10 through a first surface 1 (3), which is placed to face opposite to the image display device 9 and serves as both entrance and exit surfaces. The light is incident on a second surface 2, which is a decentered reflecting surface. The light is reflected by the second surface 2 and exits from the modified prism 10 through the first surface 1 (third surface 3), which is also a transmitting surface placed on an observer's visual axis 8 between the second surface 2 and a pupil 7 of an observer's eye. Then, the light travels along the observer's visual axis 8, enters the observer's pupil 7 without forming an intermediate image, and forms an image on the retina of the observer's eye.

Numerical data in the backward ray tracing of this example will be shown later as Numerical Example 1. In this example, the modified prism 10 must be properly shaped by providing it with a top surface 20 and so forth in order to form the modified prism 10 into a practical configuration. When the top surface 20 is provided, ghost light occurs along the optical path shown in part (b) of FIG. 16. In this case, the top surface 20 is a flat surface, and attention is focused on the upper end portion 2' of the non-effective reflecting area of the reflecting surface 2. Numerical data in the backward ray tracing of ghost light in this example will be shown later as ghost ray tracing of Numerical Example 1. In the data, surface No. 4 represents the top surface 20.

Figure 16A:
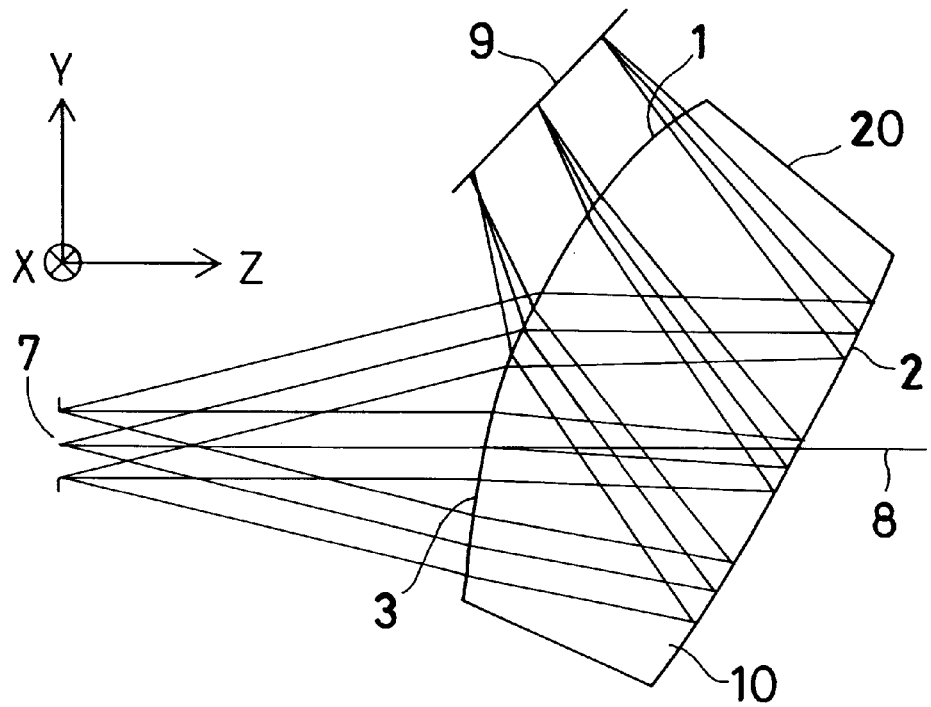
FIG. 16 is a ray path diagram showing display light and ghost light in an optical system according to Numerical Example 1 of the present invention.
Figure 16B:
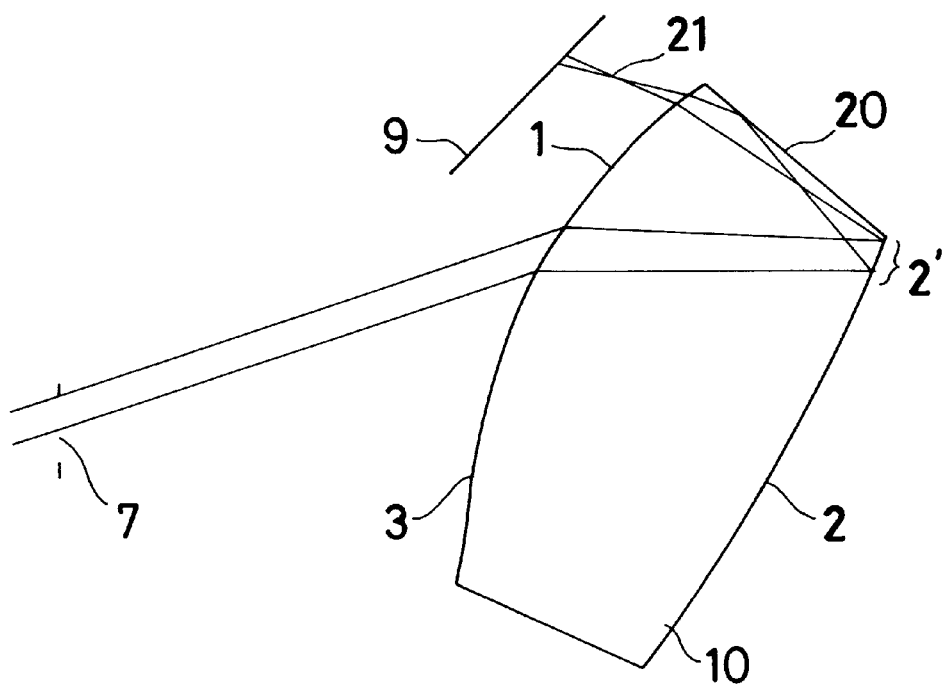

In part (b) of FIG. 16, non-effective light 21 emanating from the image display device 9 at a relatively large exit angle enters the modified prism 10 through the first surface 1, which serves as both entrance and exit surfaces. Thereafter, the non-effective light 21 is totally reflected by the top surface 20 and further reflected at the upper end portion 2' of the non-effective reflecting area of the second surface 2. The reflected non-effective light 21 passes through the first surface 1 (3), which serves as both entrance and exit surfaces, and undesirably enters the pupil 7 of the observer's eyeball E as ghost light.

Thus, when the modified prism 10 is designed in a specific form, the first surface 1, which serves as both entrance and exit surfaces, is arranged such that an area of the first surface 1 through which the effective light passes [see part (a) of FIG. 16] and an area of the first surface 1 through which the ghost light 21 passes [see part (b) of FIG. 16] overlap each other. Therefore, a member for preventing the occurrence of flare or ghost light cannot be provided on the overlap area of the first surface 1. For this reason, the most effective way of preventing the occurrence of flare or ghost light is to suppress the reflection at the top surface 20 or the upper end portion 2', which are non-effective areas. Thus, it will be understood to be necessary to cut off the light 21, which would otherwise enter the pupil 7, by coating the top surface 20 or the upper end portion 2' with a black coating material for light absorption as an antireflection member, as stated above.

Figure 17A:
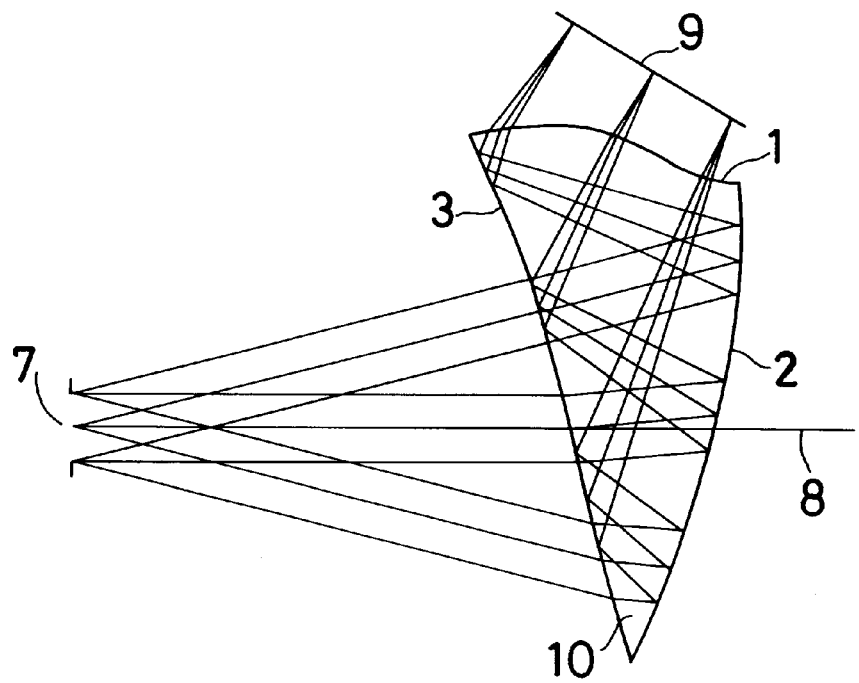
FIG. 17 is a ray path diagram showing display light and ghost light in an optical system according to Numerical Example 2 of the present invention.
Figure 17B:
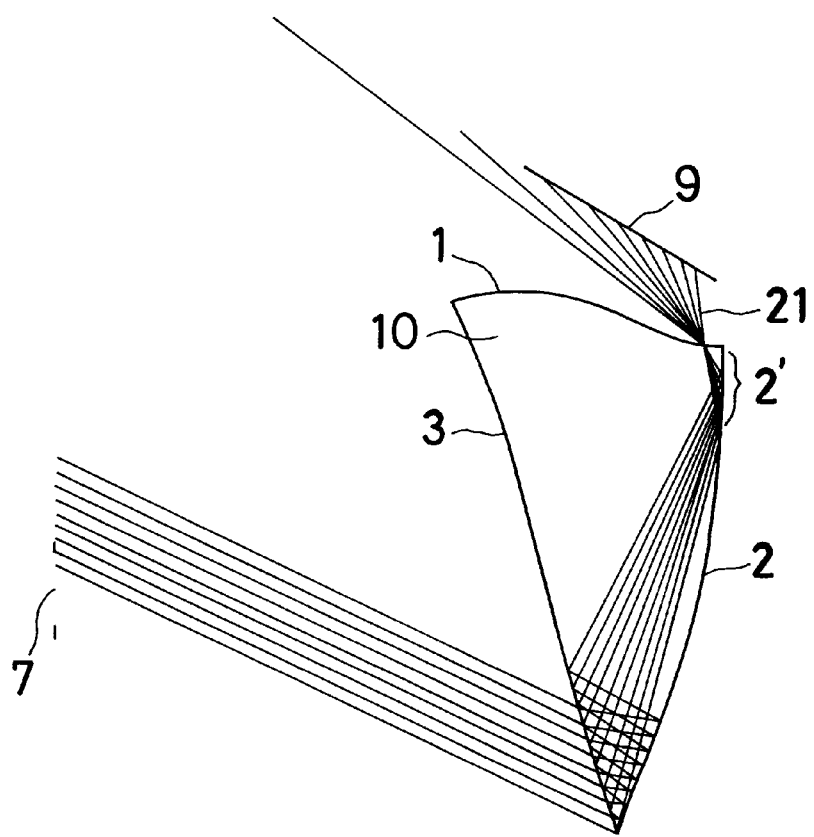

FIG. 17 is a ray path diagram showing display light [part (a)] and ghost light [part (b)] in an optical system of an image display apparatus according to an example corresponding to the embodiment shown in FIG. 1. Numerical data in the backward ray tracing of this example will be shown later as Numerical Example 2. In addition, numerical data in the backward ray tracing of ghost light in this example will be shown later as ghost ray tracing of Numerical Example 2. In this example, a modified prism 10 used as an ocular optical system of an image display apparatus is a decentered prism member having three optical surfaces 1 to 3 each decentered with respect to an observer's visual axis 8. A space formed by the three surfaces 1 to 3 is filled with an optically transparent medium having a refractive index larger than 1. Display light from an image display device 9 enters the modified prism 10 through a first surface 1, which is placed to face opposite to the image display device 9. The light is internally reflected toward a second surface 2 by a third surface 3, which is a reflecting surface placed on the observer's visual axis 8 between the second surface 2 and a pupil 7 of an observer's eye to serve also as a transmitting surface. The reflected light is internally reflected toward the third surface 3 by the second surface 2, which is a reflecting surface, and exits from the modified prism 10 through the third surface 3. Then, the light travels along the observer's visual axis 8, enters the observer's pupil 7 without forming an intermediate image, and forms an image on the retina of the observer's eye.

The optical path of ghost light in this example is shown in part (b) of FIG. 17. In this case, non-effective light 21 emanating from the image display device 9 at a relatively large exit angle enters the modified prism 10 through the first surface 1, which is an entrance surface.

Thereafter, the non-effective light 21 is totally reflected at the upper end portion 2' of the second surface 2 and further totally reflected at a portion near the lower end of the third surface 3. The reflected light is reflected at a portion near the lower end of the second surface 2. Then, the reflected light passes through the third surface 3 and undesirably enters the pupil 7 of the observer's eyeball E as ghost light. Therefore, it will be understood to be necessary to cut off the light 21, which would otherwise enter the pupil 7, for example, by coating the upper end portion 2' of the second surface 2 with a black coating material for light absorption as an antireflection member, as stated above.

Figure 18A:
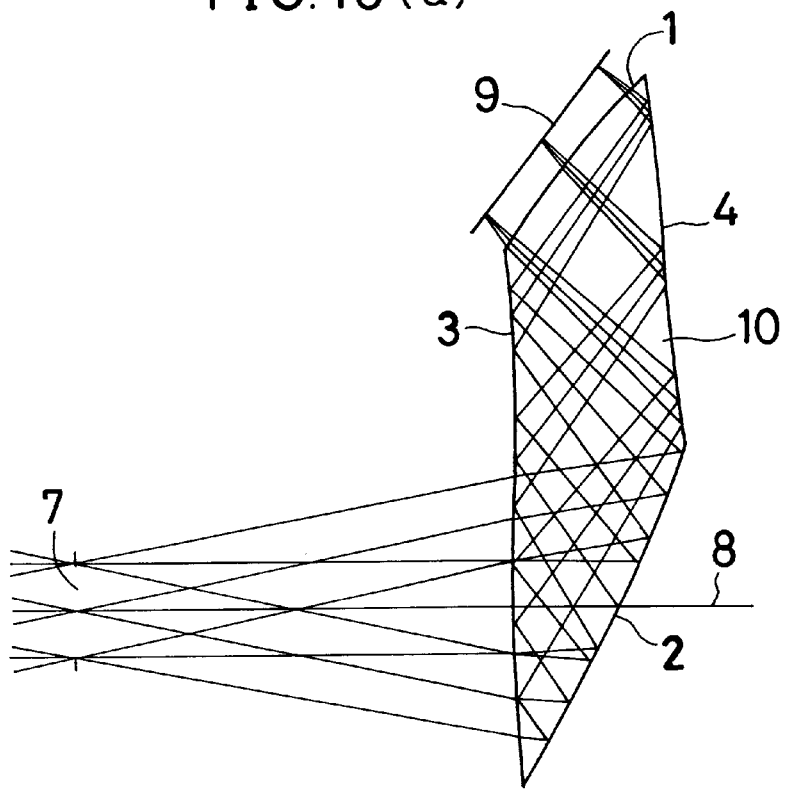
FIG. 18 is a ray path diagram showing display light and ghost light in an optical system according to Numerical Example 3 of the present invention.
Figure 18B:
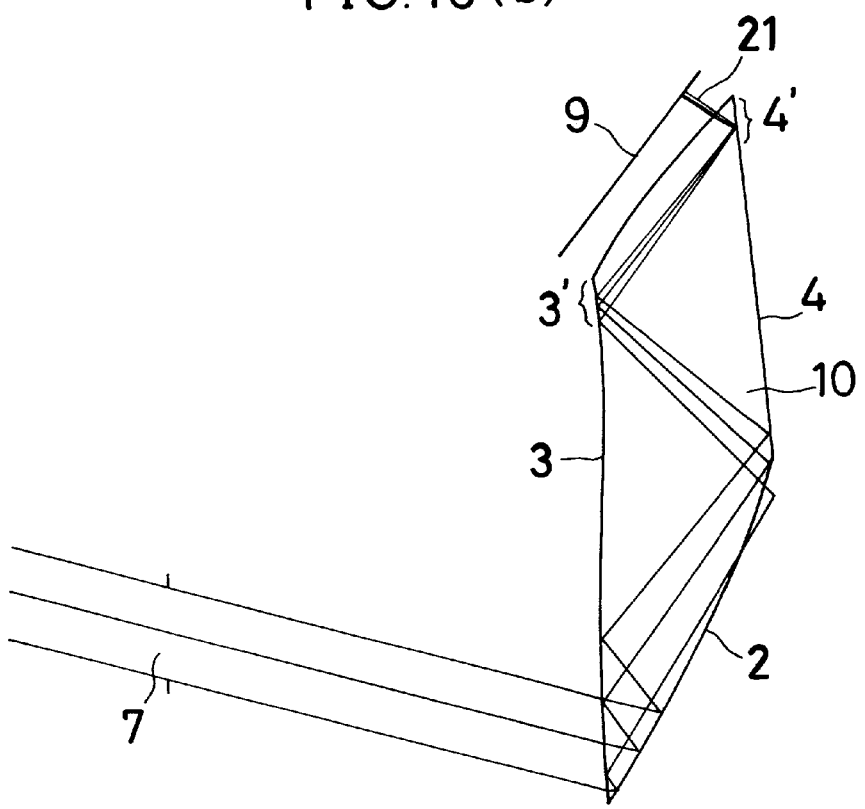

FIG. 18 is a ray path diagram showing display light [part (a)] and ghost light [part (b)] in an optical system of an image display apparatus according to an example corresponding to the embodiment shown in FIG. 5. Numerical data in the backward ray tracing of this example will be shown later as Numerical Example 3. In addition, numerical data in the backward ray tracing of ghost light in this example will be shown later as ghost ray tracing of Numerical Example 3. In this example, a modified prism 10 is a decentered prism member having four optical surfaces 1 to 4 each decentered with respect to an observer's visual axis 8. A space formed by the four surfaces 1 to 4 is filled with an optically transparent medium having a refractive index larger than 1. Display light from an image display device 9 enters the modified prism 10 through a first surface 1, which is placed to face opposite to the image display device 9. The light is internally reflected toward a third surface 3 by a fourth surface 4, which is a reflecting surface facing opposite to the third surface 3. The reflected light is internally reflected toward a second surface 2 by the third surface 3, which is also a transmitting surface. The reflected light is internally reflected toward the third surface 3 by the second surface 2, which is a reflecting surface, and exits from the modified prism 10 through the third surface 3. Then, the light travels along the observer's visual axis 8, enters the observer's pupil 7 without forming an intermediate image, and forms an image on the retina of the observer's eye.

The optical path of ghost light in this example is shown in part (b) of FIG. 18. In this case, non-effective light 21 emanating from the image display device 9 at a relatively large exit angle enters the modified prism 10 through the first surface 1, which is an entrance surface. Thereafter, the non-effective light 21 is totally reflected at the upper end portion 4' of the fourth surface 4 and further totally reflected at the upper end portion 3' of the third surface 3. The reflected light is totally reflected at a portion near the lower end of the fourth surface 4 and further totally reflected at a portion near the lower end of the third surface 3. The reflected light is further reflected at the lower end of the second surface 2. Then, the reflected light passes through the third surface 3 and undesirably enters the pupil 7 of the observer's eyeball E as ghost light. Therefore, it will be understood to be necessary to cut off the light 21, which would otherwise enter the pupil 7, for example, by coating the upper end portion 3' of the third surface 3 with a black coating material for light absorption as an antireflection member, as stated above.

The following is a description of numerical data in the backward ray tracing of the above-described Numerical Examples 1 to 3 and ghost ray tracing of Numerical Examples 1 to 3. In constituent parameters of each numerical example and ghost ray tracing thereof described later), as shown in part (a) of FIG. 16, the center of an exit pupil (coincident with the observer's pupil) 7 of the modified prism 10 is defined as the origin of the optical system in the backward ray tracing, and an optical axis (coincident with the observer's visual axis) 8 is defined by an axial principal ray passing through the center (origin) of the exit pupil 7. A Z-axis is taken in the direction in which the axial principal ray travels from the exit pupil 7 along the optical axis 8. A Y-axis is taken in the direction extending through the center of the exit pupil 7 at right angles to the Z-axis in a plane in which light rays are bent by the modified prism 10. An X-axis is taken in the direction extending through the center of the exit pupil 7 at right angles to both the Y- and Z-axes. The direction in which the Z-axis extends from the exit pupil 7 toward the modified prism 10 is defined as a positive direction of the Z-axis. The direction in which the Y-axis extends from the optical axis 8 toward the image display device 9 is defined as a positive direction of the Y-axis. The direction in which the X-axis constitutes a right-handed system in combination with the Y- and Z-axes is defined as a positive direction of the X-axis. It should be noted that ray tracing is carried out in a direction in which light rays enter the modified prism 10 from the exit pupil (7) side of the modified prism 10, which is defined as an object side.

Regarding decentered surfaces, each surface is given displacements in the X-, Y- and Z-axis directions of the vertex position of the surface from the center of the exit pupil 7, which is the origin of the modified prism 10, and tilt angles [$\alpha$, $\beta$, and $\gamma(°)$] of the center axis of the surface [in regard to a free-form surface and a rotationally symmetric aspherical surface, the Z-axes of the following equations (a) and (b), respectively] with respect to the X-, Y- and Z-axes. In this case, positive $\alpha$ and $\beta$ mean counterclockwise rotation relative to the positive directions of the corresponding axes, and positive $\gamma$ means clockwise rotation relative to the positive direction of the Z-axis. In addition, the radius of curvature of each spherical surface, surface separation, and refractive index of each medium, together with Abbe's number, are given according to the conventional method.

It should be noted that the configuration of a free-form surface, which is a rotationally asymmetric surface, is defined by the following equation. The Z-axis of the defining equation is the axis of the rotationally asymmetric surface.

$$Z = \Sigma_n \Sigma_m C_{nm} X^n Y^{n-m}$$

where $\Sigma_n$ indicates that n of $\Sigma$ is from 0 to k, and $\Sigma_m$ indicates that m of $\Sigma$ is from 0 to n.

In a case where a plane-symmetry free-form surface (i.e. a free-form surface having only one plane of symmetry) is defined by the equation expressing a free-form surface, when symmetry produced by the plane of symmetry is to be obtained in the X-axis direction, terms with odd-numbered powers of X are made zero (for example, the coefficients of the terms with odd-numbered powers of X are set equal to zero). To obtain symmetry produced by the plane of symmetry in the Y-axis direction, terms with odd-numbered powers of Y are made zero (for example, the coefficients of the terms with odd-numbered powers of Y are set equal to zero).

Assuming that k=7 (polynomial of degree 7), for example, a plane-symmetry free-form surface which is symmetric with respect to the X-axis direction is expressed by an expanded form of the above equation as follows:

$$Z = C_2 + C_3 Y + C_4 X + C_5 Y^2 + C_6 YX + C_7 X^2 + C_8 Y^3 + C_9 Y^2 X + \quad \text{(a)}$$
$$C_{10} YX^2 + C_{11} X^3 + C_{12} Y^4 + C_{13} Y^3 X + C_{14} Y^2 X^2 + C_{15} YX^3 +$$
$$C_{16} X^4 + C_{17} Y^5 + C_{18} Y^4 X + C_{19} Y^3 X^2 + C_{20} Y^2 X^3 + C_{21} YX^4 +$$
$$C_{22} X^5 + C_{23} Y^6 + C_{24} Y^5 X + C_{25} Y^4 X^2 + C_{26} Y^3 X^3 + C_{27} Y^2 X^4 +$$
$$C_{28} YX^5 + C_{29} X^6 + C_{30} Y^7 + C_{31} Y^6 X + C_{32} Y^5 X^2 + C_{33} Y^4 X^3 +$$
$$C_{34} Y^3 X^4 + C_{35} Y^2 X^5 + C_{36} YX^6 + C_{37} X^7$$

In the above equation (a), the coefficients $C_4$, $C_6$, $C_9$ ... of the terms with odd-numbered powers of X are set equal to zero (see numerical examples described later). It should be noted that coefficients concerning aspherical surfaces which are not shown in the constituent parameters (shown later) are zero.

Plane-symmetry free-form surfaces may also be defined by Zernike polynomials. That is, the configuration of a free-form surface may be defined by the following equation (b). The Z-axis of the defining equation (b) is the axis of Zernike polynomial.

$$X = R \times \cos(A) \quad \text{(b)}$$
$$Y = R \times \sin(A)$$
$$Z = D_2 +$$
$$\quad D_3 R\cos(A) + D_4 R\sin(A) +$$
$$\quad D_5 R^2\cos(2A) + D_6(R^2 - 1) + D_7 R^2\sin(2A) +$$
$$\quad D_8 R^3\cos(3A) + D_9(3R^3 - 2R)\cos(A) +$$
$$\quad D_{10}(3R^3 - 2R)\sin(A) + D_{11} R^3\sin(3A) +$$
$$\quad D_{12} R^4\cos(4A) + D_{13}(4R^4 - 3R^2)\cos(2A) +$$
$$\quad D_{14}(6R^4 - 6R^2 + 1) + D_{15}(4R^4 - 3R^2)\sin(2A) +$$
$$\quad D_{16} R^4\sin(4A) + D_{17} R^5\cos(5A) +$$
$$\quad D_{18}(5R^5 - 4R^3)\cos(3A) +$$
$$\quad D_{19}(10R^5 - 12R^3 + 3R)\cos(A) +$$
$$\quad D_{20}(10R^5 - 12R^3 + 3R)\sin(A) +$$
$$\quad D_{21}(5R^5 - 4R^3)\sin(3A) + D_{22} R^5\sin(5A) +$$
$$\quad D_{23} R^6\cos(6A) + D_{24}(6R^6 - 5R^4)\cos(4A) +$$
$$\quad D_{25}(15R^6 - 20R^4 + 6R^2)\cos(2A) +$$
$$\quad D_{26}(20R^6 - 30R^4 + 12R^2 - 1) +$$
$$\quad D_{27}(15R^6 - 20R^4 + 6R^2)\sin(2A) +$$
$$\quad D_{28}(6R^6 - 5R^4)\sin(4A) + D_{29} R^6\sin(6A)$$

It should be noted that in the above equation the surface is expressed as symmetric with respect to the X-axis direction. In the defining equation, $D_m$ is (m is an integer of 2 or higher) are coefficients.

As an example of other expressions of surfaces usable in the present invention, the above defining equation ($Z = \Sigma_n \Sigma_m C_{nm} X^n Y^{n-m}$) may be expanded to express a surface which is symmetric with respect to the X-axis direction and in which k=7, as shown by the following equation (c) as in the case of equation (a):

$$Z = C_2 + C_3Y + C_4|X| + C_5Y^2 + C_6Y|X| + C_7X^2 + C_8Y^3 +$$
$$C_9Y^2|X| + C_{10}YX^2 + C_{11}|X^3| + C_{12}Y^4 + C_{13}Y^3|X| + C_{14}Y^2X^2 +$$
$$C_{15}Y|X^3| + C_{16}X^4 + C_{17}Y^5 + C_{18}Y^4|X| + C_{19}Y^3X^2 + C_{20}Y^2|X^3| +$$
$$C_{21}YX^4 + C_{22}|X^5| + C_{23}Y^6 + C_{24}Y^5|X| + C_{25}Y^4X^2 + C_{26}Y^3|X^3| +$$
$$C_{27}Y^2X^4 + C_{28}Y|X^5| + C_{29}X^6 + C_{30}Y^7 + C_{31}Y^6|X| +$$
$$C_{32}Y^5X^2 + C_{33}Y^4|X^3| + C_{34}Y^3X^4 + C_{35}Y^2|X^5| + C_{36}YX^6 + C_{37}|X^7| \quad (c)$$

In the constituent parameters (shown later), those terms concerning aspherical surfaces for which no data is shown are zero. The refractive index is expressed by the refractive index for the spectral d-line (wavelength: 587.56 nanometers). Lengths are given in millimeters.

In Numerical Examples 1 to 3 described below, free-form surfaces defined by the above-described equation (a) are used as follows: In Numerical Example 1, shown in FIG. 16, the first surface 1 and the second surface 2 are decentered free-form surfaces; in Numerical Example 2, shown in FIG. 17, the first to third surfaces 1 to 3 are decentered free-form surfaces; and in Numerical Example 3, shown in FIG. 18, all the first to fourth surfaces 1 to 4 are decentered free-form surfaces.

Constituent parameters of the above-described Numerical Examples 1 to 3 and ghost ray tracing of Numerical Examples 1 to 3 are shown below. In ghost ray tracing of Numerical Example 1, surface No. 4 is the top surface 20, and surface No. 5 is the first surface 1. In ghost ray tracing of Numerical Example 2, surface No. 5 is the second surface 2, and surface No. 6 is the first surface 1. In ghost ray tracing of Numerical Example 3, surface No. 6 is the third surface 3, surface No. 7 is the fourth surface 4, and surface No. 8 is the first surface 1. In ghost ray tracing of Numerical Example 2, the pupil position is displaced in the positive direction of the Z-axis relative to that in Numerical Example 2 for the purpose of facilitating the ghost ray tracing. As illustrated in part (b) of FIG. 17, which shows the result of the tracing, ghost light is incident on the original position of the pupil 7. In each table below, free-form surfaces are denoted by "FFS".

Numerical example 1

| Surface No. | Radius of curvature | Surface separation | Displacement and tilt | Refractive index | Abbe's No. |
|---|---|---|---|---|---|
| 1 | ∞(Pupil) | | | | |
| 2 | FFS[1] | | (1) | 1.5254 | 56.2 |
| 3 | FFS[2] | | (2) | 1.5254 | 56.2 |
| 4 | FFS[1] | | (1) | | |
| Image plane | ∞ | | (3) | | |

FFS[1]

| $C_5$ | $1.1128 \times 10^{-2}$ | $C_7$ | $1.3993 \times 10^{-2}$ | $C_8$ | $9.6645 \times 10^{-4}$ |
| $C_{10}$ | $1.2235 \times 10^{-3}$ | $C_{12}$ | $-6.8248 \times 10^{-5}$ | $C_{14}$ | $-3.2220 \times 10^{-5}$ |
| $C_{16}$ | $1.0344 \times 10^{-5}$ | $C_{17}$ | $1.5998 \times 10^{-6}$ | $C_{19}$ | $1.3888 \times 10^{-6}$ |
| $C_{21}$ | $-7.4398 \times 10^{-7}$ | | | | |

FFS[2]

| $C_5$ | $-1.0561 \times 10^{-1}$ | $C_7$ | $2.8750 \times 10^{-2}$ | $C_8$ | $-3.0206 \times 10^{-3}$ |
| $C_{10}$ | $2.6710 \times 10^{-3}$ | $C_{12}$ | $-1.7050 \times 10^{-5}$ | $C_{14}$ | $2.0491 \times 10^{-5}$ |
| $C_{16}$ | $2.7370 \times 10^{-5}$ | $C_{17}$ | $8.3324 \times 10^{-7}$ | $C_{19}$ | $-9.2625 \times 10^{-7}$ |
| $C_{21}$ | $2.3689 \times 10^{-7}$ | | | | |

Displacement and tilt(1)

| X | 0.00 | Y | −2.53 | Z | 25.37 |
| α | −7.36 | β | 0.00 | γ | 0.00 |

Displacement and tilt(2)

| X | 0.00 | Y | 26.27 | Z | 52.42 |
| α | 31.89 | β | 0.00 | γ | 0.00 |

Displacement and tilt(3)

| X | 0.00 | Y | 20.45 | Z | 28.97 |
| α | −45.00 | β | 0.00 | γ | 0.00 |

Ghost ray tracing of Numerical example 1

| Surface No. | Radius of curvature | Surface separation | Displacement and tilt | Refractive index | Abbe's No. |
|---|---|---|---|---|---|
| 1 | ∞(Pupil) | | | | |
| 2 | FFS[1] | | (1) | 1.5254 | 56.2 |
| 3 | FFS[2] | | (2) | 1.5254 | 56.2 |
| 4 | ∞ | | (3) | 1.5254 | 56.2 |
| 5 | FFS[1] | | (1) | | |
| Image plane | ∞ | | (4) | | |

FFS[1]

| $C_5$ | $1.1128 \times 10^{-2}$ | $C_7$ | $1.3993 \times 10^{-2}$ | $C_8$ | $9.6645 \times 10^{-4}$ |
| $C_{10}$ | $1.2235 \times 10^{-3}$ | $C_{12}$ | $-6.8248 \times 10^{-5}$ | $C_{14}$ | $-3.2220 \times 10^{-5}$ |
| $C_{16}$ | $1.0344 \times 10^{-5}$ | $C_{17}$ | $1.5998 \times 10^{-6}$ | $C_{19}$ | $1.3888 \times 10^{-6}$ |
| $C_{21}$ | $-7.4398 \times 10^{-7}$ | | | | |

FFS[2]

| $C_5$ | $-1.0561 \times 10^{-1}$ | $C_7$ | $2.8750 \times 10^{-2}$ | $C_8$ | $-3.0206 \times 10^{-3}$ |
| $C_{10}$ | $2.6710 \times 10^{-3}$ | $C_{12}$ | $-1.7050 \times 10^{-5}$ | $C_{14}$ | $2.0491 \times 10^{-5}$ |
| $C_{16}$ | $2.7370 \times 10^{-5}$ | $C_{17}$ | $8.3324 \times 10^{-7}$ | $C_{19}$ | $-9.2625 \times 10^{-7}$ |
| $C_{21}$ | $2.3689 \times 10^{-7}$ | | | | |

Displacement and tilt(1)

| X | 0.00 | Y | −2.53 | Z | 25.37 |
| α | −7.36 | β | 0.00 | γ | 0.00 |

Displacement and tilt(2)

| X | 0.00 | Y | 26.27 | Z | 52.42 |
| α | 31.89 | β | 0.00 | γ | 0.00 |

Displacement and tilt(3)

| X | 0.00 | Y | 10.00 | Z | 52.00 |
| α | 52.00 | β | 0.00 | γ | 0.00 |

Displacement and tilt(4)

| X | 0.00 | Y | 20.45 | Z | 28.97 |
| α | −45.00 | β | 0.00 | γ | 0.00 |

Numerical example 2

| Surface No. | Radius of curvature | Surface separation | Displacement and tilt | Refractive index | Abbe's No. |
|---|---|---|---|---|---|
| 1 | ∞(Pupil) | | | | |
| 2 | FFS[1] | | (1) | 1.4922 | 57.5 |
| 3 | FFS[2] | | (2) | 1.4922 | 57.5 |
| 4 | FFS[1] | | (1) | 1.4922 | 57.5 |
| 5 | FFS[3] | | (3) | | |
| Image plane | ∞ | | (4) | | |

FFS[1]

| $C_5$ | $-4.4223 \times 10^{-3}$ | $C_7$ | $-4.1581 \times 10^{-3}$ | $C_8$ | $-2.9680 \times 10^{-4}$ |
| $C_{10}$ | $2.8812 \times 10^{-5}$ | $C_{12}$ | $-7.3481 \times 10^{-6}$ | $C_{14}$ | $4.4914 \times 10^{-6}$ |
| $C_{16}$ | $6.2722 \times 10^{-7}$ | $C_{17}$ | $-8.1897 \times 10^{-8}$ | $C_{19}$ | $1.2907 \times 10^{-7}$ |
| $C_{21}$ | $9.2494 \times 10^{-9}$ | | | | |

FFS[2]

| $C_5$ | $-9.2658 \times 10^{-3}$ | $C_7$ | $-1.0130 \times 10^{-2}$ | $C_8$ | $-7.5606 \times 10^{-5}$ |

-continued

| | | | | | |
|---|---|---|---|---|---|
| $C_{10}$ | $2.1034 \times 10^{-5}$ | $C_{12}$ | $2.1393 \times 10^{-6}$ | $C_{14}$ | $-2.7793 \times 10^{-6}$ |
| $C_{16}$ | $-1.2842 \times 10^{-6}$ | $C_{17}$ | $-6.4123 \times 10^{-9}$ | $C_{19}$ | $-2.8338 \times 10^{-8}$ |
| $C_{21}$ | $-5.4578 \times 10^{-9}$ | | | | |

FFS[3]

| | | | | | |
|---|---|---|---|---|---|
| $C_5$ | $-2.9258 \times 10^{-2}$ | $C_7$ | $3.2305 \times 10^{-3}$ | $C_8$ | $-2.2320 \times 10^{-3}$ |
| $C_{10}$ | $7.4280 \times 10^{-4}$ | $C_{12}$ | $1.7812 \times 10^{-4}$ | $C_{14}$ | $2.7445 \times 10^{-4}$ |
| $C_{16}$ | $-6.5178 \times 10^{-6}$ | $C_{17}$ | $-7.7579 \times 10^{-6}$ | $C_{19}$ | $-2.3770 \times 10^{-5}$ |
| $C_{21}$ | $2.1584 \times 10^{-6}$ | | | | |

Displacement and tilt(1)

| | | | | | |
|---|---|---|---|---|---|
| X | 0.00 | Y | 7.04 | Z | 27.95 |
| α | 17.58 | β | 0.00 | γ | 0.00 |

Displacement and tilt(2)

| | | | | | |
|---|---|---|---|---|---|
| X | 0.00 | Y | 0.84 | Z | 39.00 |
| α | −11.96 | β | 0.00 | γ | 0.00 |

Displacement and tilt(3)

| | | | | | |
|---|---|---|---|---|---|
| X | 0.00 | Y | 16.89 | Z | 32.66 |
| α | 70.77 | β | 0.00 | γ | 0.00 |

Displacement and tilt(4)

| | | | | | |
|---|---|---|---|---|---|
| X | 0.00 | Y | 20.82 | Z | 34.81 |
| α | 60.31 | β | 0.00 | γ | 0.00 |

Ghost ray tracing of Numerical example 2

| Surface No. | Radius of curvature | Surface separation | Displacement and tilt | Refractive index | Abbe's No. |
|---|---|---|---|---|---|
| 1 | ∞(Pupil) | | | | |
| 2 | FFS[1] | | (1) | 1.4922 | 57.5 |
| 3 | FFS[2] | | (2) | 1.4922 | 57.5 |
| 4 | FFS[1] | | (1) | 1.4922 | 57.5 |
| 5 | FFS[2] | | (2) | 1.4922 | 57.5 |
| 6 | FFS[3] | | (3) | | |
| Image plane | ∞ | | (4) | | |

FFS[1]

| | | | | | |
|---|---|---|---|---|---|
| $C_5$ | $-4.4223 \times 10^{-3}$ | $C_7$ | $-4.1581 \times 10^{-3}$ | $C_8$ | $-2.9680 \times 10^{-4}$ |
| $C_{10}$ | $2.8812 \times 10^{-5}$ | $C_{12}$ | $-7.3481 \times 10^{-6}$ | $C_{14}$ | $4.4914 \times 10^{-6}$ |
| $C_{16}$ | $6.2722 \times 10^{-7}$ | $C_{17}$ | $-8.1897 \times 10^{-8}$ | $C_{19}$ | $1.2907 \times 10^{-7}$ |
| $C_{21}$ | $9.2494 \times 10^{-9}$ | | | | |

FFS[2]

| | | | | | |
|---|---|---|---|---|---|
| $C_5$ | $-9.2658 \times 10^{-3}$ | $C_7$ | $-1.0130 \times 10^{-2}$ | $C_8$ | $-7.5606 \times 10^{-5}$ |
| $C_{10}$ | $2.1034 \times 10^{-5}$ | $C_{12}$ | $2.1393 \times 10^{-6}$ | $C_{14}$ | $-2.7793 \times 10^{-6}$ |
| $C_{16}$ | $-1.2842 \times 10^{-6}$ | $C_{17}$ | $-6.4123 \times 10^{-9}$ | $C_{19}$ | $-2.8338 \times 10^{-8}$ |
| $C_{21}$ | $-5.4578 \times 10^{-9}$ | | | | |

FFS[3]

| | | | | | |
|---|---|---|---|---|---|
| $C_5$ | $-2.9258 \times 10^{-2}$ | $C_7$ | $3.2305 \times 10^{-3}$ | $C_8$ | $-2.2320 \times 10^{-3}$ |
| $C_{10}$ | $7.4280 \times 10^{-4}$ | $C_{12}$ | $1.7812 \times 10^{-4}$ | $C_{14}$ | $2.7445 \times 10^{-4}$ |
| $C_{16}$ | $-6.5178 \times 10^{-6}$ | $C_{17}$ | $-7.7579 \times 10^{-6}$ | $C_{19}$ | $-2.3770 \times 10^{-5}$ |
| $C_{21}$ | $2.1584 \times 10^{-6}$ | | | | |

Displacement and tilt(1)

| | | | | | |
|---|---|---|---|---|---|
| X | 0.00 | Y | 7.04 | Z | 15.95 |
| α | 17.58 | β | 0.00 | γ | 0.00 |

Displacement and tilt(2)

| | | | | | |
|---|---|---|---|---|---|
| X | 0.00 | Y | 0.84 | Z | 27.00 |
| α | −11.96 | β | 0.00 | γ | 0.00 |

Displacement and tilt(3)

| | | | | | |
|---|---|---|---|---|---|
| X | 0.00 | Y | 16.89 | Z | 20.66 |
| α | 70.77 | β | 0.00 | γ | 0.00 |

Displacement and tilt(4)

| | | | | | |
|---|---|---|---|---|---|
| X | 0.00 | Y | 20.82 | Z | 22.81 |
| α | 60.31 | β | 0.00 | γ | 0.00 |

Numerical example 3

| Surface No. | Radius of curvature | Surface separation | Displacement and tilt | Refractive index | Abbe's No. |
|---|---|---|---|---|---|
| 1 | ∞(Pupil) | | | | |
| 2 | FFS[1] | | (1) | 1.5254 | 56.2 |
| 3 | FFS[2] | | (2) | 1.5254 | 56.2 |
| 4 | FFS[1] | | (1) | 1.5254 | 56.2 |
| 5 | FFS[3] | | (3) | 1.5254 | 56.2 |
| 6 | FFS[4] | | (4) | | |
| Image plane | ∞ | | (5) | | |

FFS[1]

| | | | | | |
|---|---|---|---|---|---|
| $C_5$ | $-3.6911 \times 10^{-4}$ | $C_7$ | $-8.8876 \times 10^{-3}$ | $C_8$ | $-6.8334 \times 10^{-5}$ |
| $C_{10}$ | $-1.6292 \times 10^{-4}$ | $C_{12}$ | $-4.9977 \times 10^{-7}$ | $C_{14}$ | $-3.3636 \times 10^{-6}$ |
| $C_{16}$ | $2.6709 \times 10^{-6}$ | $C_{17}$ | $-4.0743 \times 10^{-10}$ | $C_{19}$ | $-7.4264 \times 10^{-8}$ |
| $C_{21}$ | $1.1323 \times 10^{-7}$ | | | | |

FFS[2]

| | | | | | |
|---|---|---|---|---|---|
| $C_5$ | $-4.3372 \times 10^{-3}$ | $C_7$ | $-8.6703 \times 10^{-3}$ | $C_8$ | $-5.9743 \times 10^{-5}$ |
| $C_{10}$ | $-2.7245 \times 10^{-5}$ | $C_{12}$ | $1.2159 \times 10^{-6}$ | $C_{14}$ | $-1.0043 \times 10^{-6}$ |
| $C_{16}$ | $-2.5364 \times 10^{-8}$ | $C_{17}$ | $-3.3859 \times 10^{-8}$ | $C_{19}$ | $-2.2080 \times 10^{-8}$ |
| $C_{21}$ | $-9.2979 \times 10^{-9}$ | | | | |

FFS[3]

| | | | | | |
|---|---|---|---|---|---|
| $C_5$ | $-3.4913 \times 10^{-4}$ | $C_7$ | $-3.5118 \times 10^{-3}$ | $C_8$ | $-9.1030 \times 10^{-5}$ |
| $C_{10}$ | $-1.3279 \times 10^{-4}$ | $C_{12}$ | $-9.4802 \times 10^{-7}$ | $C_{14}$ | $-1.8853 \times 10^{-6}$ |
| $C_{16}$ | $2.6882 \times 10^{-6}$ | $C_{17}$ | $3.9933 \times 10^{-8}$ | $C_{19}$ | $-7.2847 \times 10^{-8}$ |
| $C_{21}$ | $3.8837 \times 10^{-7}$ | | | | |

FFS[4]

| | | | | | |
|---|---|---|---|---|---|
| $C_5$ | $5.3077 \times 10^{-3}$ | $C_7$ | $1.0870 \times 10^{-2}$ | $C_8$ | $-5.4504 \times 10^{-4}$ |
| $C_{10}$ | $-6.1272 \times 10^{-4}$ | $C_{12}$ | $1.3463 \times 10^{-5}$ | $C_{14}$ | $-5.4972 \times 10^{-5}$ |
| $C_{16}$ | $-2.2752 \times 10^{-5}$ | $C_{17}$ | $-3.2003 \times 10^{-7}$ | $C_{19}$ | $-1.0693 \times 10^{-6}$ |
| $C_{21}$ | $5.3863 \times 10^{-6}$ | | | | |

Displacement and tilt(1)

| | | | | | |
|---|---|---|---|---|---|
| X | 0.00 | Y | 9.24 | Z | 38.43 |
| α | −0.52 | β | 0.00 | γ | 0.00 |

Displacement and tilt(2)

| | | | | | |
|---|---|---|---|---|---|
| X | 0.00 | Y | 0.00 | Z | 47.61 |
| α | −26.69 | β | 0.00 | γ | 0.00 |

Displacement and tilt(3)

| | | | | | |
|---|---|---|---|---|---|
| X | 0.00 | Y | 29.83 | Z | 51.75 |
| α | 4.88 | β | 0.00 | γ | 0.00 |

Displacement and tilt(4)

| | | | | | |
|---|---|---|---|---|---|
| X | 0.00 | Y | 37.91 | Z | 43.09 |
| α | −41.02 | β | 0.00 | γ | 0.00 |

Displacement and tilt(5)

| | | | | | |
|---|---|---|---|---|---|
| X | 0.00 | Y | 40.00 | Z | 40.94 |
| α | −38.58 | β | 0.00 | γ | 0.00 |

Ghost ray tracing of Numerical example 3

| Surface No. | Radius of curvature | Surface separation | Displacement and tilt | Refractive index | Abbe's No. |
|---|---|---|---|---|---|
| 1 | ∞(Pupil) | | | | |
| 2 | FFS[1] | | (1) | 1.5254 | 56.2 |
| 3 | FFS[2] | | (2) | 1.5254 | 56.2 |
| 4 | FFS[1] | | (1) | 1.5254 | 56.2 |
| 5 | FFS[3] | | (3) | 1.5254 | 56.2 |
| 6 | FFS[1] | | (1) | 1.5254 | 56.2 |
| 7 | FFS[3] | | (3) | 1.5254 | 56.2 |
| 8 | FFS[4] | | (4) | | |
| Image plane | ∞ | | (5) | | |

FFS[1]

| | | | | | |
|---|---|---|---|---|---|
| $C_5$ | $-3.6911 \times 10^{-4}$ | $C_7$ | $-8.8876 \times 10^{-3}$ | $C_8$ | $-6.8334 \times 10^{-5}$ |
| $C_{10}$ | $-1.6292 \times 10^{-4}$ | $C_{12}$ | $-4.9977 \times 10^{-7}$ | $C_{14}$ | $-3.3636 \times 10^{-6}$ |

-continued

| | | | | | |
|---|---|---|---|---|---|
| $C_{18}$ | $2.6709 \times 10^{-6}$ | $C_{17}$ | $-4.0743 \times 10^{-10}$ | $C_{19}$ | $-7.4264 \times 10^{-8}$ |
| $C_{21}$ | $1.1323 \times 10^{-7}$ | | | | |
| FFS[2] | | | | | |
| $C_5$ | $-4.3372 \times 10^{-3}$ | $C_7$ | $-8.6703 \times 10^{-3}$ | $C_8$ | $-5.9743 \times 10^{-5}$ |
| $C_{10}$ | $-2.7245 \times 10^{-5}$ | $C_{12}$ | $1.2159 \times 10^{-6}$ | $C_{14}$ | $-1.0043 \times 10^{-6}$ |
| $C_{16}$ | $-2.5364 \times 10^{-8}$ | $C_{17}$ | $-3.3859 \times 10^{-8}$ | $C_{19}$ | $-2.2080 \times 10^{-8}$ |
| $C_{21}$ | $-9.2979 \times 10^{-9}$ | | | | |
| FFS[3] | | | | | |
| $C_5$ | $-3.4913 \times 10^{-4}$ | $C_7$ | $-3.5118 \times 10^{-3}$ | $C_8$ | $-9.1030 \times 10^{-5}$ |
| $C_{10}$ | $-1.3279 \times 10^{-4}$ | $C_{12}$ | $-9.4802 \times 10^{-7}$ | $C_{14}$ | $-1.8853 \times 10^{-6}$ |
| $C_{16}$ | $2.6882 \times 10^{-6}$ | $C_{17}$ | $3.9933 \times 10^{-8}$ | $C_{19}$ | $-7.2847 \times 10^{-8}$ |
| $C_{21}$ | $3.8837 \times 10^{-7}$ | | | | |
| FFS[4] | | | | | |
| $C_5$ | $5.3077 \times 10^{-3}$ | $C_7$ | $1.0870 \times 10^{-2}$ | $C_8$ | $-5.4504 \times 10^{-4}$ |
| $C_{10}$ | $-6.1272 \times 10^{-4}$ | $C_{12}$ | $1.3463 \times 10^{-5}$ | $C_{14}$ | $-5.4972 \times 10^{-5}$ |
| $C_{16}$ | $-2.2752 \times 10^{-5}$ | $C_{17}$ | $-3.2003 \times 10^{-7}$ | $C_{19}$ | $-1.0693 \times 10^{-6}$ |
| $C_{21}$ | $5.3863 \times 10^{-6}$ | | | | |

Displacement and tilt(1)

| X | 0.00 | Y | 9.24 | Z | 38.43 |
|---|---|---|---|---|---|
| $\alpha$ | $-0.52$ | $\beta$ | 0.00 | $\gamma$ | 0.00 |

Displacement and tilt(2)

| X | 0.00 | Y | 0.00 | Z | 47.61 |
|---|---|---|---|---|---|
| $\alpha$ | $-26.69$ | $\beta$ | 0.00 | $\gamma$ | 0.00 |

Displacement and tilt(3)

| X | 0.00 | Y | 29.83 | Z | 51.75 |
|---|---|---|---|---|---|
| $\alpha$ | 4.88 | $\beta$ | 0.00 | $\gamma$ | 0.00 |

Displacement and tilt(4)

| X | 0.00 | Y | 37.91 | Z | 43.09 |
|---|---|---|---|---|---|
| $\alpha$ | $-41.02$ | $\beta$ | 0.00 | $\gamma$ | 0.00 |

Displacement and tilt(5)

| X | 0.00 | Y | 40.00 | Z | 40.94 |
|---|---|---|---|---|---|
| $\alpha$ | $-38.58$ | $\beta$ | 0.00 | $\gamma$ | 0.00 |

Incidentally, if an image display apparatus is formed by using two ocular optical systems each including a modified prism 10 according to the present invention, which is arranged to prevent degradation of the displayed image due to flare or ghost light as stated above, it becomes unnecessary for the observer to close one eye when viewing the image for observation. Viewing with both eyes enables the user to perform observation without fatigue. Furthermore, if images with a disparity therebetween are presented to observer's left and right eyes, respectively, it is possible to view a stereoscopic image. In addition, it becomes possible for the observer to see the observation image in a desired posture at ease by using two ocular optical systems according to the present invention and providing a support mechanism for supporting the ocular optical systems on the observer's head.

Figure 19:
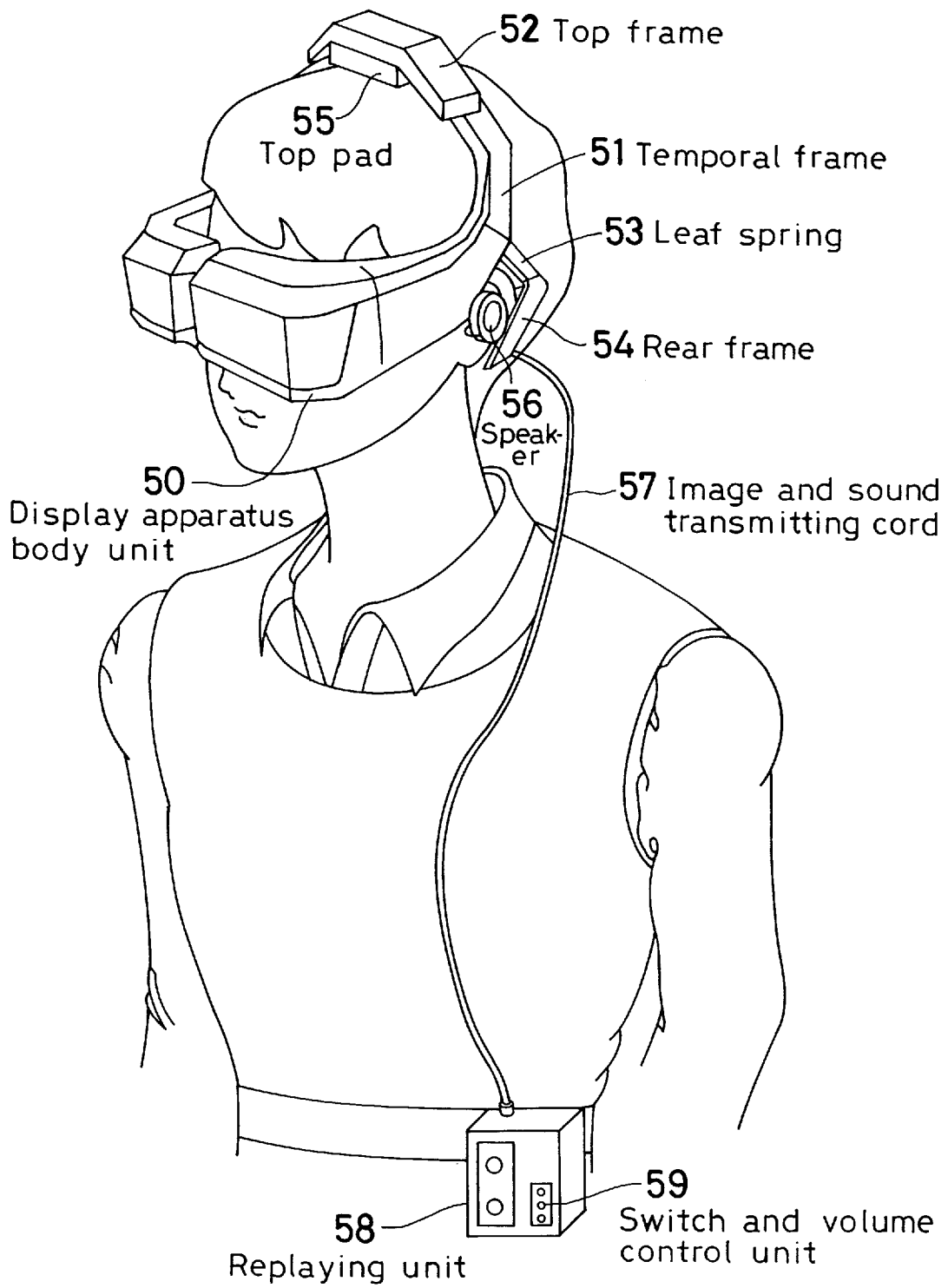
FIG. 19 is a diagram showing the whole arrangement of one example of a portable image display apparatus incorporating an ocular optical system according to the present invention.

It is possible to form a stationary or portable image display apparatus, such as a head-mounted image display apparatus, which enables the observer to see with both eyes by preparing a pair of combinations of an ocular optical system according to the present invention, arranged as described above, and an image display device for the left and right eyes, and supporting them apart from each other by the interpupillary distance, i.e. the distance between the two eyes. FIG. 19 shows the whole arrangement of an example of such a portable image display apparatus. A display apparatus body unit 50 contains a pair of ocular optical systems (for left and right eyes) such as those described above, and image display devices comprising liquid crystal display devices are placed in the respective image planes of the two ocular optical systems. The apparatus body unit 50 is provided with a pair of temporal frames 51 which are contiguous with the left and right ends of the apparatus body unit 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears, like the temples of a pair of glasses, and placing the top frame 52 on the top of the observer's head, the display apparatus body unit 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display apparatus on his or her head without feeling uncomfortable.

Further, a speaker 56 is provided on each rear frame 54 to enable the user to enjoy listening to stereophonic sound in addition to image observation. The display apparatus body unit 50 having the speakers 56 is connected with a replaying unit 58, e.g. a portable video cassette unit, through an image and sound transmitting cord 57. Therefore, the user can enjoy not only observing an image but also listening to sound with the replaying unit 58 retained on a desired position, e.g. a belt, as illustrated in the figure. Reference numeral 59 in the figure denotes a switch and volume control part of the replaying unit 58. It should be noted that the top frame 52 contains electronic parts such as image and sound processing circuits.

The cord 57 may have a jack and plug arrangement attached to the distal end thereof so that the cord 57 can be detachably connected to an existing video deck. The cord 57 may also be connected to a TV signal receiving tuner so as to enable the user to enjoy watching TV. Alternatively, the cord 15 may be connected to a computer to receive computer graphic images or message images or the like from the computer. To eliminate the bothersome cord, the image display apparatus may be arranged to receive external radio signals through an antenna connected thereto.

Although the image display apparatus according to the present invention has been described by way of some embodiments, it should be noted that the present invention is not necessarily limited to these embodiments and that various changes and modifications may be imparted thereto.

As will be clear from the foregoing description, according to the present invention, an antireflection member or a light-blocking member, which has a flare- or ghost-preventing action, is provided over a non-effective area outside the effective reflecting or transmitting area of a reflecting or transmitting surface of a prism member used as an ocular optical system of an image display apparatus. Therefore, it is possible to reduce unwanted light caused by reflection or transmission at the non-effective area of the reflecting or transmitting surface and hence possible to provide an image display apparatus of favorable resolution, which is free from flare or ghost.

What is claimed is:

1. An image display apparatus, comprising:
   an image display device and an ocular optical system that leads an image formed by said image display device so that said image is observed as a virtual image,
   wherein said ocular optical system comprises a prism member formed from a medium having a refractive index (n) larger than 1 (n>1),
   said prism member comprising:
     a first surface having an action through which a light beam enters said prism member;
     a second surface having an action by which the light beam is reflected in said prism member; and a third surface having an action through which the light beam exits from said prism member, wherein an antireflection member having a flare- or ghost-preventing action is provided over a part of a non-effective reflecting area of at least said second surface, exclusive of an effective reflecting area, said effective reflecting area being an area reflecting an effective light beam that forms said virtual image, and wherein the effective reflecting area of said second surface is formed from a mirror reflecting surface provided with a reflective mirror coating, and said antireflection member is provided over a part of a non-effective reflecting area of at least said second surface on a side of said mirror reflecting surface closer to said image display device.

2. An image display apparatus, comprising:

an image display device and an ocular optical system that leads an image formed by said image display device so that said image is observed as a virtual image, wherein said ocular optical system comprises a prism member formed from a medium having a refractive index (n) larger than 1 (n>1), said prism member comprising:

a first surface having an action through which a light beam enters said prism member;

a second surface having an action by which the light beam is reflected in said prism member; and a third surface having an action through which the light beam exits from said prism member, wherein an antireflection member having a flare- or ghost-preventing action is provided over a part of a non-effective reflecting area of at least said second surface, exclusive of an effective reflecting area, said effective reflecting area being an area reflecting an effective light beam that forms said virtual image, and wherein the effective reflecting area of said second surface is formed from a mirror reflecting surface provided with a reflective mirror coating, and said antireflection member is provided over a part of a non-effective reflecting area of at least said second surface on a side of said mirror reflecting surface remote from said image display device.

3. An image display apparatus, comprising:

an image display device and an ocular optical system that leads an image formed by said image display device so that said image is observed as a virtual image, wherein said ocular optical system comprises a prism member formed from a medium having a refractive index (n) larger than 1 (n>1), said prism member comprising:

a first surface having an action through which a light beam enters said prism member;

a second surface having an action by which the light beam is reflected in said prism member; and a third surface having an action through which the light beam exits from said prism member, wherein an antireflection member having a flare- or ghost-preventing action is provided over a part of a non-effective reflecting area of at least said second surface, exclusive of an effective reflecting area, said effective reflecting area being an area reflecting an effective light beam that forms said virtual image, and wherein an identical surface serves as both said first surface and said third surface.

4. An image display apparatus according to claim 1, 2 or 3, wherein said antireflection member is an antireflection coating of a medium having a refractive index larger than 1.

5. An image display apparatus according to any one of claim 1, 2 or 3, wherein said antireflection member is a light-absorbing member having an absorptance higher than a reflectivity thereof for light rays.

6. an image display apparatus according to any one of claim 1, 2 or 3, wherein said antireflection member is a rough surface having a higher degree of surface roughness than said effective reflecting area.

7. An image display apparatus according to claim 6, wherein said antireflection member is a corrugated surface that scatters reflected light to reduce an intensity of light rays that would otherwise become flare or ghost.

8. An image display apparatus according to claim 1, 2 or 3, wherein the non-effective reflecting area of said second surface is formed from a discontinuous surface that is discontinuous with said effective reflecting area, said antireflection member being formed from said discontinuous surface.

9. An image display apparatus according to claim 1, 2 or 3, wherein the non-effective reflecting area of said second surface is formed from a tilted surface having a tilt different from a tilt of said effective reflecting area, said antireflection member being formed from said tilted surface.

10. An image display apparatus, comprising:

an image display device and an ocular optical system that leads an image formed by said image display device so that said image is observed as a virtual image, wherein said ocular optical system comprises a prism member formed from a medium having a refractive index (n) larger than 1 (n>1), said prism member comprising:

a first surface having an action through which a light beam enters said prism member;

a second surface having an action by which the light beam is reflected in said prism member; and a third surface having an action through which the light beam exits from said prism member, wherein a light-blocking member having a flare- or ghost-preventing action is provided over a part of a non-effective transmitting area of at least said first surface, exclusive of an effective transmitting area, said effective transmitting area being an area transmitting an effective light beam that forms said virtual image, and wherein said first surface is placed to face opposite to said image display device, and said light-blocking member is formed from a light-blocking wall extending from said first surface toward said image display device between the effective transmitting area and non-effective transmitting area of said first surface.

11. An image display apparatus according to claim 10, wherein said light-blocking wall has a ridge configuration approximately coincident with a contour of a display area of said image display device.

12. An image display apparatus, comprising:

an image display device and an ocular optical system that leads an image formed by said image display device so that said image is observed as a virtual image, wherein said ocular optical system comprises a prism member formed from a medium having a refractive index (n) larger than 1 (n>1), said prism member comprising:

a first surface having an action through which a light beam enters said prism member;

a second surface having an action by which the light beam is reflected in said prism member; and a third surface having an action through which the light beam exits from said prism member, wherein a light-blocking member having a flare- or ghost-preventing action is provided over a part of a non-effective transmitting area of at least said first surface, exclusive of an effective transmitting area, said effective transmitting area being an area transmitting an effective light beam that forms said virtual image, and wherein said light-blocking member is provided over at least a part of said non-effective transmitting area of said first surface on each of left and right sides of said effective transmitting area.

13. An image display apparatus, comprising:

an image display device and an ocular optical system that leads an image formed by said image display device so that said image is observed as a virtual image, wherein said ocular optical system comprises a prism member formed from a medium having a refractive index (n) larger than 1 (n>1), said prism member comprising:

a first surface having an action through which a light beam enters said prism member;

a second surface having an action by which the light beam is reflected in said prism member; and a third surface having an action through which the light beam exits from said prism member, wherein a light-blocking member having a flare- or ghost-preventing action is provided over a part of a non-effective transmitting area of at least said first surface, exclusive of an effective transmitting area, said effective transmitting area being an area transmitting an effective light beam that forms said virtual image, and wherein said light-blocking member is provided over a whole of said non-effective transmitting area of said first surface.

14. An image display apparatus, comprising:

an image display device and an ocular optical system that leads an image formed by said image display device so that said image is observed as a virtual image, wherein said ocular optical system comprises a prism member formed from a medium having a refractive index (n) larger than 1 (n>1), said prism member comprising:

a first surface having an action through which a light beam enters said prism member;

a second surface having an action by which the light beam is reflected in said prism member; and a third surface having an action through which the light beam exits from said prism member, wherein a light-blocking member having a flare- or ghost-preventing action is provided over a part of a non-effective transmitting area of at least said first surface, exclusive of an effective transmitting area, said effective transmitting area being an area transmitting an effective light beam that forms said virtual image, and wherein an identical surface serves as both said first surface and said third surface.

15. An image display apparatus according to claim 10, 12, 13, or 14, wherein said light-blocking member is a light-absorbing member having an absorptance higher than a transmittance thereof for light rays.

16. An image display apparatus according to claim 15, wherein said light-absorbing member is formed by bonding a black coating material.

17. An image display apparatus according to claim 1, 2, 3, 10, 12, 13 or 14, wherein said third surface of said prism member has an action through which the light beam exits from said prism member and further has an action by which the light beam entering said prism member is reflected in an optical path between said first surface and said second surface.

18. An image display apparatus according to claim 17, wherein said prism member consists of three surfaces each having a light beam-transmitting or reflecting optical action, said three surfaces including said first surface, said second surface and said third surface, said prism member being arranged such that a light beam entering said prism member through said first surface is reflected by said third surface and thereafter reflected by said second surface and exits from said prism member through said third surface.

19. An image display apparatus according to claim 1, 2, 3, 10, 12, 13 or 14, wherein said prism member further has a fourth surface placed in an optical path between said first surface and said third surface, said fourth surface having an action by which a light beam is reflected in said prism member.

20. A head-mounted image display apparatus according to claim 1, 2, 3, 10, 12, 13 or 14, wherein a support member is provided to support said image display apparatus on a head of an observer so as to hold said image display apparatus in front of an eye of the observer.

21. An image display apparatus according to claim 5, wherein said light-absorbing member is formed by bonding a black coating material.

* * * * *